United States Patent [19]

Ito et al.

[11] Patent Number: 5,750,214
[45] Date of Patent: May 12, 1998

[54] LIQUID CRYSTAL DEVICE

[75] Inventors: Nobuhiro Ito, Sagamihara; Yasuaki Takeda, Chigasaki; Yukio Hanyu, Isehara; Masanobu Asaoka, Yokohama; Ikuo Nakazawa, Atsugi; Yasufumi Asao, Isehara; Takashi Moriyama, Atsugi, all of Japan

[73] Assignee: Canon Kabushiki Kaisha, Tokyo, Japan

[21] Appl. No.: 766,883

[22] Filed: Dec. 13, 1996

[51] Int. Cl.⁶ .................................................. G02F 1/1337
[52] U.S. Cl. ............................. 428/1; 428/1; 349/123; 349/135
[58] Field of Search ........................ 428/1; 349/123, 349/133, 135

[56] References Cited

U.S. PATENT DOCUMENTS 5,317,429  5/1994  Mochizuki et al. .................... 349/123

OTHER PUBLICATIONS

Radcliffe, 4th Intl. Ferroelectric L.C. Conf., (Dec. 1993), p. 46.

Saito, Reports on Prog. in Polymer Physics in Japan, XXI, 411, (Dec. 1969).

Chandini, J.J.A.P. 27, (Dec. 1988), L. 729.

*Primary Examiner*—Alexander Thomas
*Attorney, Agent, or Firm*—Fitzpatrick, Cella, Harper & Scinto

[57] ABSTRACT

A liquid crystal device is constituted by a pair of substrates at least one of which is provided with an alignment control film, and a liquid crystal composition disposed between the substrates and contacting the alignment control film. The alignment control film comprises an amide polymer and a pyridine-based polymer. The liquid crystal device using a mixture alignment control film described above is effective in improving a switching characteristic by minimizing a depolarization field while keeping a uniform alignment characteristic.

17 Claims, 2 Drawing Sheets

LIQUID CRYSTAL DEVICE

FIELD OF THE INVENTION AND RELATED ART

The present invention relates to a liquid crystal device including a chiral smectic liquid crystal composition used as, e.g., a light-valve for flat-panel displays, projection displays, printers, etc.

There has been known a cathode ray tube (CRT) as a display device. The CRT has widely been used as a display terminal for outputting motion pictures of a television receiver or a video tape recording (VTR) apparatus or used as a monitor for a personal computer. However, the CRT encounters problems when outputs still images, in view of its characteristics, such that recognizability is liable to be lowered due to flickering and scanning fringes caused by an insufficient resolution and that degradation or deterioration of a fluorescent substance due to burning is caused to occur in some cases. In recent years, it has been found that an electromagnetic wave generated by the CRT adversely affects human body. As a result, the CRT can break health of video display terminal (VDT) operators in some cases. In addition, the CRT has a structure including a large volume behind a picture area (display portion), whereby space-saving utilization of an office or a house in which the CRT is used is hindered and there is a possibility that the CRT fails to sufficiently play a part in displays in an advanced information-oriented society.

Liquid crystal devices have been used as a display device having solved the above-mentioned problems of the CRT. For instance, there have been known liquid crystal devices using use TN (twisted nematic) type liquid crystals, as shown in "Voltage-Dependent Optical Activity of a Twisted Nematic Liquid Crystal" by M. Schadt and W. Helfrich "Applied Physics Letters" Vol. 18, No. 4 (Feb. 15, 1971) pp. 127–128.

One of the above-mentioned TN-type liquid crystal devices is a simple matrix-type liquid crystal device having the advantage of inexpensive production costs. When the liquid crystal device is driven by using an electrode matrix structure with an improved pixel density in accordance with a multiplex driving scheme, the liquid crystal device is liable to encounter a problem of occurrence of crosstalk, so that the number of pixels is restricted. Further, the uses of the device as a display device is also limited since the response speed is too slow, i.e., on the order of at least several ten milliseconds.

In recent years, there have been proposed active matrix-type liquid crystal devices using a thin film transistor (TFT). These liquid crystal devices can control a display state pixel by pixel since each pixel is provided with a transistor, whereby the devices solve problems of crosstalk and response speed. However, as these devices have a larger picture area, it is industrially more difficult to prepare a liquid crystal device with no defective pixels. Even if it is possible to prepare such a liquid crystal device, the device is more expensive.

To overcome the above-mentioned drawbacks of such conventional liquid crystal devices, the use of liquid crystal devices using a liquid crystal material having bistability has been proposed by Clark and Lagerwall (e.g. Japanese Laid-Open Patent Appln. (JPA) No. 56-107216; U.S. Pat. No. 4,367,924, etc.). In this instance, as the liquid crystal material having bistability, a ferroelectric (or chiral smectic) liquid crystal having chiral smectic C-phase (SmC*) or H-phase (SmH*) is generally used. The ferroelectric liquid crystal can effect inversion switching due to its spontaneous polarization, thus showing a very high response speed. Further, the ferroelectric liquid crystal shows at least two stable states including bistable states providing a memory characteristic and is excellent in view angle characteristics, so that a liquid crystal device using a ferroelectric liquid crystal is considered suitable for a display device or light-valve having properties including high-speed responsiveness, high resolution and a large picture area. In recent years, there has been proposed an anti-ferroelectric chiral smectic liquid crystal device assuming three stable states, as described in "Japanese Journal of Applied Physics" vol. 27, p. L729 (1988) by Chanani and Takezoe et al.

In case where in such a liquid crystal device, a chiral smectic liquid crystal is aligned by using an ordinary polyimide alignment control film which has been subjected to rubbing, a resultant apparent tilt angle (a half of an angle formed by molecular axes providing two stable states) is generally at most 3–8 degrees, thus leading to a transmittance of 3–5%. As a result, such a liquid crystal device provides a considerably low contrast, i.e., a contrast ratio of about 10. Further, the contrast ratio is also lowered by occurrence of zigzag alignment defects and due to a twist of liquid crystal molecules between a pair of substrates (called a splay alignment), as described in "Structures and Properties of Ferroelectric Liquid Crystals" (1990) by Atsuo Fukuda and Hideo Takezoe issued by Corona Publishing Co. Ltd. (Tokyo Japan). The zigzag defects may be attributable to a layer structure of a chiral smectic liquid crystal including two types of chevron-shaped smectic layer structures between a pair of substrates in the device.

Hanyu et al. (JP-A 3-252624 corr. to U.S. Pat. No. 5,189,536) has realized a liquid crystal device free from zig-zag defects by increasing a pretilt angle of liquid crystal molecules at a boundary with an alignment control film to provide a uniform (single) chevron-shaped layer structure whereby the splay alignment is made elastically unstable compared with a uniform alignment and a liquid crystal device providing a high contrast by increasing an apparent tilt angle. However, even when the liquid crystal device proposed by Hanyu et al is used, it is necessary to provide a tilt angle of 16 degrees in order to allow a good driving state. Accordingly, there is still room for further improvement in view of an ideal tilt angle (22.5 degrees) providing a maximum transmittance. In addition, the inclination of smectic layers inherent in the chevron structure lowers a transmittance, thus resulting in a low contrast.

On the other hand, there has been recently proposed a layer structure of a (chiral smectic) liquid crystal wherein a high contrast ratio is intended to be realized by suppressing a chevron layer structure resulting in a low contrast ratio and providing the liquid crystal with a bookshelf layer structure (hereinafter referred to as "bookshelf structure") or with a structure close to the bookshelf structure (e.g., Atsuo Fukuda (Editor)) "Future Liquid Crystal Display and Its Materials" (1992), issued by K.K. CMC (Tokyo Japan). One of methods for realizing a bookshelf structure is a method of using a naphthalene-based liquid crystal material. In this method, however, the resultant liquid crystal device has a tilt angle of about 10 degrees, which is much smaller than a tilt angle of 22.5 degrees which theoretically provides a maximum transmittance, thus resulting in a low transmittance. In addition, such a liquid crystal material fails to exhibit a bookshelf structure reversibly with respect to temperature in many cases. Another method for giving a bookshelf structure may include one inducing a bookshelf structure by externally applying an electric field to a liquid crystal device. Such a method, however, involves a problem of unstability against external stimuli such as a temperature fluctuation. In addition, various other problems to be solved are presumably present in order to put a liquid crystal material exhibiting a bookshelf structure into practical use since such a material has recently been discovered or proposed.

Further, in quite recent years, there have been proposed a mesomorphic (liquid crystal) compound having a perfluoroether terminal portion (U.S. Pat. No. 5,262,082 and International Publication No. WO93/22396) and a liquid crystal composition (Marc D. Radcliffe et al: The 4th International Ferroelectric Liquid Crystal Conference, P-46 (1993)) as materials exhibiting a bookshelf structure or a structure closer thereto. By using these liquid crystal materials in admixture with an optically active compound, it is possible to provide a bookshelf structure or a structure showing a small layer inclination angle closer to the bookshelf structure without using external fields such as an external electric field. Accordingly, these liquid crystal materials are suitable for a liquid crystal device and display apparatus providing high speed responsiveness, high definition and large picture area.

However, these liquid crystal materials (compounds and compositions) still leave room for improvement in several characteristics, such as response speed, alignment characteristic, contrast and driving stability.

However, in case where a high-brightness liquid crystal device is intended to be realized by increasing an optimum apparent tilt angle of about 22.5 degrees based on the use of a liquid crystal composition exhibiting a bookshelf structure or a structure close thereto, such a liquid crystal composition is liable to have an increased viscosity, thus resulting in a slow response speed against an applied electric field.

With respect to a response speed of (chiral smectic) liquid crystal molecules, there has been known the following relationship (1):

$$\tau = \zeta/(Ps \cdot E) \quad (1),$$

wherein $\tau$ is a time constant of response of liquid crystal molecules against an applied electric field, $\zeta$ is a resistance coefficient (called a switching viscosity, Ps is a spontaneous polarization of the liquid crystal, and E is an external electric field. Accordingly, in order to realize a high response speed (i.e., a small time constant $\tau$) in case where a viscosity $\zeta$ is increased by providing an apparent tilt angle of about 22.5 degrees for providing a high brightness as described above, it is necessary to select liquid crystal materials having a larger spontaneous polarization Ps. This is because an increase in drive voltage (external electric field) is accompanied with constraints on, e.g., electric power consumption and heat generation although application of an increased electric field is effective to some extent and therefore it is realistic to enhance a spontaneous polarization Ps of a liquid crystal material used.

However, when a Ps of a liquid crystal material is increased, a resultant liquid crystal device is accompanied with other problems, such as an occurrence of hysteresis with respect to (or difference in) inversion (switching) threshold voltages between two stable states, and a decrease in drive margin particularly at low temperature due to a temperature-dependence of Ps. These may be attributable to a depolarization field (or reverse electric field) component ($V_{reverse}$) represented by formulae (2) and (3) shown below induced by localization of, e.g., impurity ions within a liquid crystal layer at an boundary between the liquid crystal layer and an alignment control film (or an electrode) to adversely affect an electric field-response of liquid crystal molecules.

$$V_{reverse} = \{-2Ps/(C_i + C_{lc})\} \exp(-t/\tau) \quad (2),$$

where Ps denotes a spontaneous polarization of a liquid crystal used, $C_i$ denotes an electrostatic capacity of an alignment control film, $C_{lc}$ denotes an electrostatic capacity of a liquid crystal layer, t denotes a time from immediately after application of an electric field (pulse voltage) and $\tau$ denotes a time constant determined based on a total electrostatic capacity ($C_i + C_{lc}$), i.e., a relaxation time of the depolarization field component.

$$\tau = CR = (C_i + C_{lc})/[(1/R_i) + (1/R_{lc})] \quad (3),$$

wherein CR denotes a product of capacity by resistance in a service circuit, Ri denotes a resistance of an alignment control layer, and $R_{lc}$ denotes a resistance of a liquid crystal layer.

As apparent from the above formulae (2) and (3), an attenuation process of the depolarization field within the liquid crystal layer is largely affected by a resistance at a boundary between the liquid crystal layer and the electrode. Therefore, it is possible to decrease an influence of the depolarization field by decreasing a resistance (or resistivity) of an alignment control layer.

In general, when a chiral smectic liquid crystal is aligned, a pair of substrates provided with the same or different polymer films showing a homogeneous alignment characteristic (e.g., a polyimide film or a polyamide film) or a tilted (inclined) alignment characteristic and subjected to a rubbing treatment in an almost same direction These polymer films (alignment control films) are insulating films, e.g., having a volume resistivity of $1 \times 10^{10}$ ohm.cm at room temperature. In this case, a depolarization field induced during electric field-response of a liquid crystal material having a high spontaneous polarization adversely affects a switching characteristic of liquid crystal molecules.

In order to solve thus problem, there have been proposed the use of electroconductive polymers as a main component or an additional component of an alignment control film, thus providing a resultant alignment control film with a low electric resistance. In addition, such an alignment control film having a decreased electric resistance has other advantages of suppressing electrostatic electrification of the alignment control film at the time of rubbing to prevent adsorption of an electrified contaminant and of realizing an improvement in a memory characteristic and uniform alignment by delocalizing (nonlocalizing) a localization of electric charge at a local surface of the alignment control film in the case of using a chiral smectic liquid crystal material showing bistability.

In order to provide a low-resistance alignment control film used in a liquid crystal device, there have been proposed alignment control films including:

(i) a π conjugated system-type conductive polymer film comprising polyaniline (JP-A 5-19264), (ii) an alignment control film comprising a polymer matrix and conductive fine particles dispersed in the polymer matrix (JP-A 3-92824), and (iii) an alignment control film containing a charge transfer complex (U.S. Pat. No. 5,231,523).

However, these alignment control films are accompanied with the following problems, respectively.

The alignment control film (i) is originally an insulating film similarly as, e.g., a polyimide film when a material for the film (i) is not doped. Accordingly, it is necessary to effect doping with acids or alkalis or electrochemical doping in order to reduce an electrical resistance of the resultant film. These doping treatment not only complicate a production process of a liquid crystal device but also are liable to cause contamination or corrosion of a liquid crystal layer or a transparent electrode due to a dopant used.

The alignment control film (ii) is liable to cause partial peeling of a layer comprising conductive fine particles and a surrounding binder resin at the time of rubbing treatment, thus resulting in an alignment defect.

The alignment control film (iii) involves problems such that a charge transfer complex is thermally unstable in general and that an electric resistance is abruptly increased in some cases when the charge transfer complex is incorporated into an alignment control layer.

SUMMARY OF THE INVENTION

An object of the present invention is to provide a liquid crystal device using a low-resistance alignment control film effective in preventing adsorption of an electrostatic contamination to the alignment control film to provide the device with a high reliability.

Another object of the present invention is to provide a liquid crystal device using a liquid crystal composition assuming a chiral smectic phase showing a good switching characteristic by suppressing an influence of a depolarization field.

A still another object of the present invention is to realize a high-speed switching in a liquid crystal device providing a high contrast and a high brightness and using a chiral smectic liquid crystal composition which has a bookshelf structure or a structure close thereto having a small layer inclination angle and a switching characteristic largely affected by a depolarization field, and to provide a liquid crystal apparatus, particularly a liquid crystal display apparatus, using the device providing a high-speed display, a high contrast and a high brightness.

A further object of the present invention is to provide a liquid crystal device, using a liquid crystal composition comprising a mesomorphic compound having a fluorocarbon terminal portion, showing a good switching characteristic by using an alignment control film having a specific composition to suppress an influence of a depolarization field.

According to the present invention, there is provided a liquid crystal device, comprising: a pair of substrates at least one of which is provided with an alignment control film, and a liquid crystal composition disposed between the substrates and contacting the alignment control film, wherein the alignment control film comprises an amide polymer and a pridine-based polymer.

The present invention further provides a liquid crystal apparatus including the liquid crystal devices described above.

These and other objects, features and advantages of the present invention will become more apparent upon a consideration of the following description of the preferred embodiments of the present invention taken in conjunction with the accompanying drawings.

DETAILED DESCRIPTION OF THE INVENTION

Figure 1:
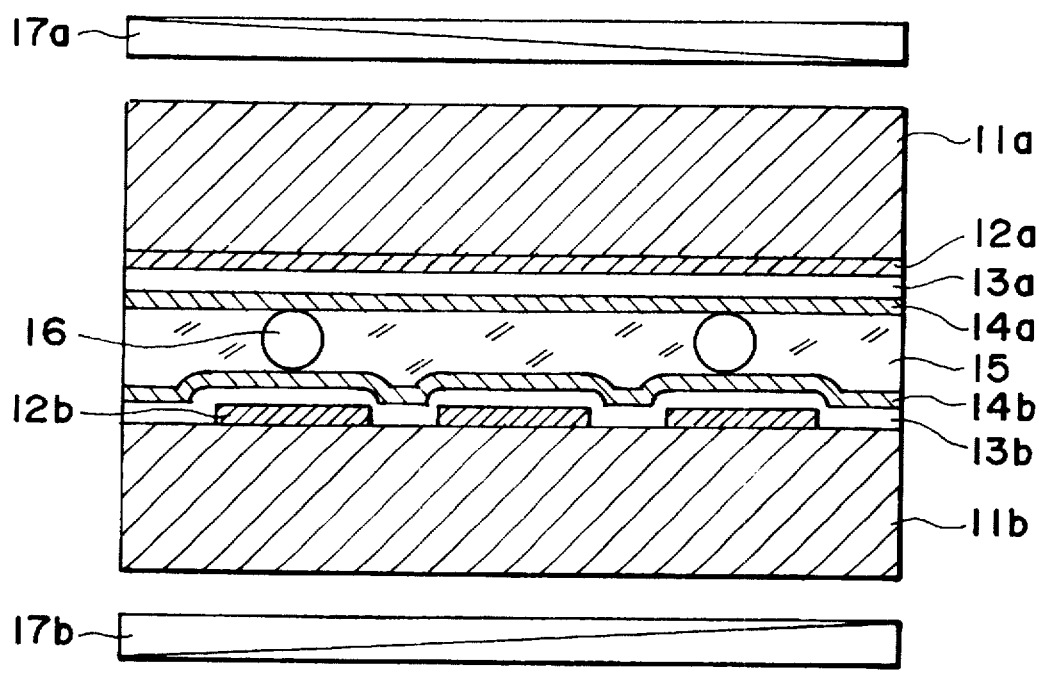
FIG. 1 is a schematic sectional view of an embodiment of a liquid crystal device according to the present invention.

In the present invention, an alignment control film provided to at least one of a pair of substrates is characterized by comprising a mixture of a material for an amide polymer and a material for a pyridine-based polymer.

The alignment control film comprising the amide polymer and the pyridine-based polymer is effective in decreasing a volume resistivity thereof and a difference in inversion (switching) threshold voltage while maintaining a good uniform alignment characteristic without employing a dopant, conductive fine particles and a charge transfer complex as described above.

Herein, the "amide polymer" means a polymer having an amide linkage and/or an imide linkage and may preferably include polyamide, polyamide-imide and polyimide. The "pyridine-based polymer" means a homopolymer or copolymer having a pyridine skeleton and may preferably include polypyridine and a polypyridine derivative (copolymer consisting of pyridine units and other heterocycle units (e.g., thiophene, pyrrole, etc.)).

In the present invention, a mechanism of providing a low volume resistivity to an alignment control film has not been clarified as yet, it may be attributable to the following factors 1 and 2.

In the following, an alignment control film comprising a combination of polyamide and polypyridine or its derivatives is used as a representative example. However, we presume that alignment control films comprising other combinations used in the present invention function similarly as the alignment control film comprising polyamide and polypyridine (derivatives) based on the factors 1 and 2 below.

Factor 1 (effective occurrence of conductive carrier due to charge transfer between two polymers).

Polypyridine has a high oxidation potential due to a strong electronegativity of lone pair of electrons of nitrogen atom in a pyridine ring and therefore can be doped with only a cation such as Pd. In other words, polypyridine is not readily oxidized and is liable to be reduced. Accordingly, in a mixing of polypyridine with polyamide (e.g., nylon), polypyridine is considered to be placed in a state rich in electron by its electron-attractive function from polyamide side. On the other hand, polyamide is considered to be placed in a state rich in proton.

A mixture film comprising polythiophenepyridine (PTpy) and nylon 66 shows the following relationship between several weight mixing ratios and corresponding absorbances in the vicinity of 490 nm based on π-π* transfer.

| PTpy/nylon 66 | 100/0 | 75/25 | 50/50 | 25/75 | 0/100 |
| --- | --- | --- | --- | --- | --- |
| Absorbance* | 1 | 1.2 | 1.05 | 0.5 | — |

*Absorbance is standardized by a concentration of thiophenepyridine ring.

These absorbances correspond to concentrations of carriers (or electrons) distributed on a main chain of polythiophenepyridine. Accordingly, in the above mixture film, polythiophenepyridine is polarized by incorporation of nylon 66, thus confirming an increase in carrier concentration compared with a single film of polythiophenepyridine.

Factor 2 (improved carrier (electron) conductive path)

As is well known, polypyridine and its derivatives are a π conjugated system-type polymer and have an advanced conductive path of conjugated electrons in their main chains. On the other hand, a polyamide resin, typically nylon 66 is generally known as an insulating material but is known as a material having proton (H⁺) conductive characteristic (e.g., S. Saito, Reports on Progress in Polymer Physics in Japan, XII, 411 (1969) and D. A. Seaner, J. Polymer, Sci. A-2, 6, 463 (1968)).

For this reason, even when polypyridine (or its derivative) and a polyamide resin is mixed, resultant respective conductive paths of carriers are considered to compensate for a loss of carrier conduction each other without causing cut-off (or conduction failure) thereof.

As described above, based on a property of a combination an amide polymer and a pyridine-based polymer such that a resultant polymer mixture functions as an improved carrier (electron) conductive polymer like a charge transfer complex.

In the present invention, when a chiral smectic liquid crystal composition is used, the amide polymer and the pyridine-based polymer described above provide an excellent uniform alignment characteristic. Of these, a polyamide resin (e.g., nylon 66) is excellent in aligning ability to a liquid crystal composition comprising a mesomorphic compound having a fluorocarbon terminal portion appearing hereinafter. Further, these amide and pyridine-based polymers have an advantage of being soluble in common solvents such as m-cresol and formic acid, thus being readily mixed with each other to facilitate a production of a liquid crystal device.

The above-described alignment control film is particularly effective in improving a switching characteristic of a high spontaneous polarization-type chiral smectic liquid crystal composition providing a bookshelf structure or a structure close thereto. However, the alignment control film is also effective in improving a switching characteristic at low temperature of a chiral smectic liquid crystal composition providing a chevron structure. The alignment control layer may be applicable to a liquid crystal device other than that using a chiral smectic liquid crystal composition in order to reduce a volume resistivity of the alignment control film.

Hereinbelow, the liquid crystal device of the present invention will be described specifically with reference to FIG. 1.

FIG. 1 shows a schematic sectional view of an embodiment of the liquid crystal device according to the present invention.

Referring to FIG. 1, a liquid crystal device includes a pair of substrates 11a and 11b (e.g., glass plates), transparent electrodes 12a and 12b (e.g., ITO films), insulating films (layers) 13a and 13b, alignment control films (layers) 14a and 14b, a liquid crystal layer 15, and a spacer 16.

At least one of the alignment control films 14a and 14b is a film (mixture film) comprising an amide polymer and a pyridine-based polymer as described above.

In a preferred embodiment of the present invention, the amide polymer may desirably be a polyamide having a recurring unit represented by a formula P-1 shown below and the pyridine-based polymer may desirably be a homopolymer or a copolymer (polypyridine or derivatives thereof) having a recurring unit represented by a formula P-2 shown below.

Formula P-1

—CONH—(CH$_2$)$_n$—NHCO—(CH$_2$)$_m$—, wherein n and m are independently an integer of 1–12.

Formula P-2

—A—B—, wherein —A— denotes pyridine-2,5-diyl connected with —B— at 2 or 5 position; and —B— denotes a divalent group comprising a heterocycle, such as pyridine ring, thiophene ring, pyrrole ring, fluorenone ring, isothianaphthenepyridine ring, furan ring or thiophenepyridine ring, in which thiophene ring and pyrrole ring may be substituted at 3 and/or 4 position with alkyl group, alkoxy group, carboxylic ester group, benzene ring, naphthalene ring or anthracene ring to optionally form a fused ring.

The amide polymer having a recurring unit P-1 may preferably have a polymerization degree (degree of polymerization) of 1,000–100,000 in view of an aligning control ability and a solubility. Similarly, the pyridine-based polymer having a recurring unit P-2 may preferably have a polymerization degree of 100–100,000, more preferably 1,000–50,000.

With respect to the alignment control layer used in the present invention, the amide polymer and the pyridine-based polymer may preferably be blended in a weight ratio of 5:95 to 50:50, more preferably 10:90 to 40:60, in order to decrease a volume resistivity of a resultant alignment control film.

At least one of the alignment control films 14a and 14b may include a film comprising known organic or inorganic materials and may be subjected to uniaxial aligning treatment (e.g., rubbing) in one direction, thus providing uniaxial aligning axes which may be parallel or anti-parallel to each other.

The insulating films 13a and 13b may generally comprise, e.g., silicon oxide or tantalum oxide and may be prepared between the transparent electrodes 12a and 12b and the alignment control films 14a and 14b, respectively, by sputtering or vapor deposition. The insulating films 13a and 13b may be omitted.

The pair of substrates 11a and 11b (having thereon the transparent electrodes 12a and 12b, the optional insulating films 13a and 13b, and the alignment control films 14a and 14b in succession) may generally be applied to each other via a spacer 16 (e.g., silica beads) with a sealing agent (not shown) disposed at the periphery thereof to prepare a blank cell.

Into the blank cell, a liquid crystal composition 15 is injected by capillary action to prepare a liquid crystal device according to the present invention.

Outside the liquid crystal device, a pair of polarizers 17a and 17b may be disposed.

The liquid crystal composition 15 may include a nematic liquid crystal composition and a smectic liquid crystal composition, preferably a chiral smectic liquid crystal composition.

In the present invention, when the chiral smectic liquid crystal composition is used, a depolarization field can particularly effectively be suppressed or minimized.

The liquid crystal composition used in the present invention may preferably comprise at least one species of a fluorine-containing mesomorphic compound, comprising a fluorocarbon terminal portion, a hydrocarbon terminal portion, and a central core connecting the terminal portions and assuming a smectic (mesomorphic) phase or a latent smectic (mesomorphic) phase. Herein, the compound having a latent smectic mesophase (or latent smectic phase) means a compound not showing (exhibiting) a smectic (meso)phase by itself but showing a smectic (meso)phase when used together with a compound showing a smectic (meso)phase or another compound having a latent smectic (meso)phase under an appropriate condition.

In a preferred class of the fluorine-containing mesomorphic compound, the fluorocarbon terminal portion may preferably be:

a group represented by the formula $-D^1-C_{xa}F_{2xa}-X$, where xa is 1-20; X is —H or —F; $-D^1-$ is $-CO-O-(CH_2)_{ra}-$, $-O-(CH_2)_{ra}-$, $-(CH_2)_{ra}-$, $-O-SO_2-$, $-SO_2-$, $-SO_2-(CH_2)_{ra}-$, $-O-(CH_2)_{ra}-O-(CH_2)_{rb}-$, $-(CH_2)_{ra}-N(C_{pa}H_{2pa+1})-SO_2-$ or $-(CH_2)_{ra}-N(C_{pa}H_{2pa+1})-CO-$; where ra and rb are independently 1-20; and pa is 0-4; or a group having at least one catenary ether oxygen atom represented by $-D^2-(C_{xb}F_{2xb}-O)_{za}-C_{ya}F_{2ya+1}$, wherein xb is 1-10 independently for each $(C_{xb}F_{2xb}-O)$; ya is 1-10; za is 1-10; $-D^2-$ is $-CO-O-C_{rc}H_{2rc}$, $-O-C_{rc}H_{2rc}-C_{rc}H_{2rc}-$, $-O-(C_{sa}H_{2sa}-O)_{ta}-C_{rd}H_{2rd}-$, $-O-SO_2-$, $-SO_2-$, $-SO_2-C_{rc}H_{2rc}-$, $-C_{rc}H_{2rc}-N(C_{pb}H_{2pb+1})-SO_2-$, $-C_{rc}H_{2rc}-N(C_{pb}H_{2pb+1})-CO-$, or a covalent bond, where rc and rd are independently 1-20; sa is independently 1-10 for each $(C_{sa}H_{2sa}-O)$; ta is 1-6; and pb is 0-4.

In the fluorine-containing mesomorphic compound used in the present invention, the mesomorphic compound may preferably have a central core comprising at least two rings independently selected from aromatic ring, heteroaromatic ring, cycloaliphatic ring, substituted aromatic ring, substituted heteroaromatic ring and substituted cycloaliphatic ring, which may be connected one with another by means of functional groups selected from —COO—, —COS—, —HC=N—, —COSe—. Rings may be fused or non-fused. Heteroatoms within the heteroaromatic ring comprise at least one atom selected from N, O or S. Non-adjacent methylene groups in cycloaliphatic rings may be substituted by O atom. The central core may preferably comprise a benzene ring and a pyrimidine ring.

It is particularly preferred to use a fluorine-containing mesomorphic compound of the following general formula (I) or (II):

Formula (I):

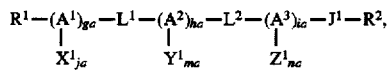

wherein $A^1$, $A^2$ and $A^3$ are each independently

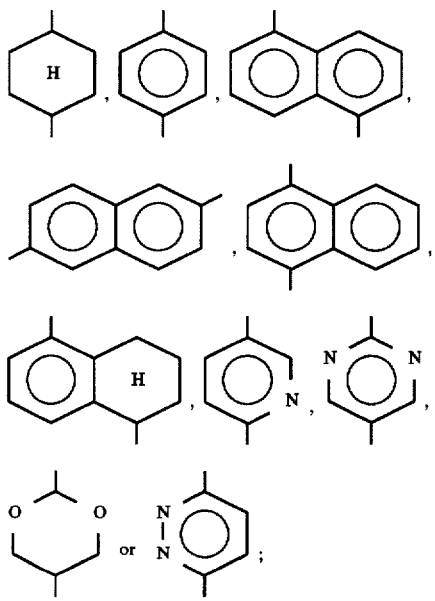

ga, ha and ia are independently an integer of 0-3 with the proviso that the sum of ga+ha+ia be at least 2;

$L^1$ and $L^2$ are each independently a covalent bond, —CO—O—, —O—CO—, —COS—, —S—CO—, —CO—Se—, —Se—CO—, —CO—Te—, —Te—CO—, —CH$_2$CH$_2$—, —CH=CH—, —C≡C—, —CH=N—, —N=CH—, —CH$_2$—O—, —O—CH$_2$—, —CO— or —O—;

$X^1$, $Y^1$ and $Z^1$ are each a substituent of $A^1$, $A^2$ and $A^3$, respectively, and each $X^1$, $Y^1$ and $Z^1$ are independently —H, —Cl, —F, —Br, —I, —OH, —OCH$_3$, —CH$_3$, —CN or —NO$_2$;

each ja, ma and na are independently an integer of 0-4;

$J^1$ is —CO—O—(CH$_2$)$_{ra}$—, —O—(CH$_2$)$_{ra}$—, —(CH$_2$)$_{ra}$—, —O—SO$_2$—, —SO$_2$—, —SO$_2$—(CH$_2$)$_{ra}$—, —O—(CH$_2$)$_{ra}$—O—(CH$_2$)$_{rb}$—, —(CH$_2$)$_{ra}$—N(C$_{pa}$H$_{2pa+1}$)—SO$_2$— or —(CH$_2$)$_{ra}$—N(C$_{pa}$H$_{2pa+1}$)— CO—; where ra and rb are independently 1-20, and pa is 0-4;

$R^1$ is —O—C$_{qa}$H$_{2qa}$—O—C$_{qb}$H$_{2qb+1}$, —C$_{qa}$H$_{2qa}$—O—C$_{qb}$H$_{2qb+1}$, —C$_{qa}$H$_{2qa}$—R$^3$, —O—C$_{qa}$H$_{21qa}$—R$^3$, —CO—O—C$_{qa}$H$_{2qa}$—R$^3$, or —CO—O—C$_{qa}$H$_{2qa}$—R$^3$ which may be either straight chain or branched; where $R^3$ is —O—CO—C$_{qb}$H$_{2q+1}$, —CO—O—C$_{qb}$H$_{2qb+1}$, —H, —Cl, —F, —CF$_3$, —NO$_2$ or —CN; and qa and qb are independently 1-20;

$R^2$ is C$_{xa}$F$_{2xa}$—X, where X is —H or —F, xa is an integer of 1-20.

Formula (II):

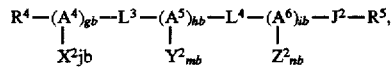

wherein $A^4$, $A^5$ and $A^6$ are each independently

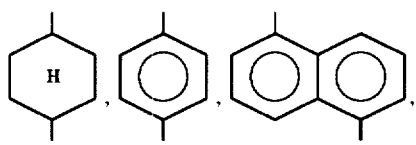

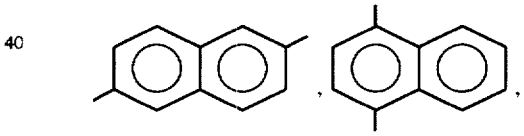

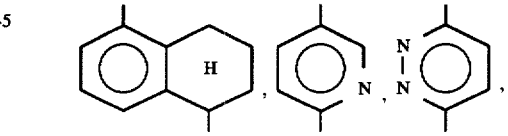

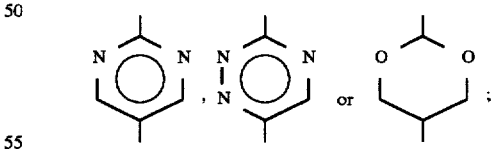

gb, hb and ib are each independently an integer of 0-3 with the proviso that the sum of gb+hb+ib be at least 2;

each $L^3$ and $L^4$ are independently a covalent bond, —CO—O—, —O—CO—, —CO—S—, —S—CO—, —CO—Se—, —Se—CO—, —CO—Te—, —Te—CO—, —(CH$_2$CH$_2$)$_{ka}$— (ka is 1-4), —CH=CH—, —C≡C—, —CH=N—, —N=CH—, —CH$_2$—O—, —O—CH$_2$—, —CO— or —O—;

$X^2$, $Y^2$ and $Z^2$ are each a substituent of $A^4$, $A^5$ and $A^6$, respectively, and each $X_2$, $Y_2$ and $Z_2$ are independently —H, —Cl, —F, —Br, —I, —OH, —OCH$_3$, —CH$_3$, —CF$_3$, —O—CF$_3$, —CN or —NO$_2$; each jb, mb and nb are independently an integer of 0–4;

J$^2$ is —CO—O—C$_{rc}$H$_{2rc}$—, —O—C$_{rc}$H$_{2rc}$—, —C$_{rc}$H$_{2rc}$—, —O—(C$_{sa}$H$_{2sa}$—O)$_{ta}$—C$_{rd}$H$_{2rd}$—, —O—SO$_2$—, —SO$_2$—, —SO$_2$—C$_{rc}$H$_{2rc}$—, —C$_{rc}$H$_{2rc}$—N(C$_{pb}$H$_{2pb+1}$)—SO$_2$— or —C$_{rc}$H$_{2rc}$-N(C$_{pb}$H$_{2pb+1}$)—CO—; rc and rd are independently 1–20; sa is independently 1–10 for each (C$_{sa}$H$_{2sa}$—O), ta is 1–6; pb is 0–4;

R$^4$ is —O—(C$_{qc}$H$_{2qc}$—O)$_{wa}$—C$_{qd}$H$_{2qd+1}$, —(C$_{qc}$H$_{2qc}$—O)$_{wa}$—C$_{qd}$H$_{2qd+1}$, —C$_{qc}$H$_{2qc}$—R$^6$, —O—C$_{qc}$H$_{2qc}$—R$^6$, —CO—O—C$_{qc}$H$_{2qc}$—R$^6$, or O—CO—C$_{qc}$H$_{2qc}$—R$^6$ which may be either straight chain or branched; R$^6$ is —O—CO—C$_{qd}$H$_{2qd+1}$; —CO—O—C$_{qd}$H$_{2qd+1}$, —Cl, —F, —CF$_3$, —NO$_2$, —CN or —H; qc and qd are independently an integer of 1–20; wa is an integer of 1–10;

R$^5$ is (C$_{xb}$F$_{2xb}$—O)$_{za}$—C$_{ya}$F$_{2ya+1}$, wherein xb is independently 1–10 for each (C$_{xb}$F$_{2xb}$—O); ya is 1–10; and za is 1–10.

The mesomorphic compound represented by the formula (I) may be synthesized through processes similar to those descried in JP-A (Kokai) 2-142753 and U.S. Pat. No. 5,082,587. Specific examples of such a mesomorphic compound of the formula (I) may include those (Example Compound Nos. I-1 to I-103) shown below.

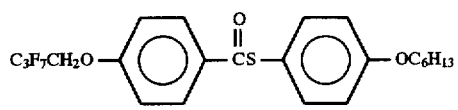

I-1

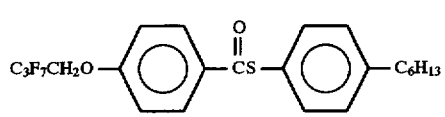

I-2

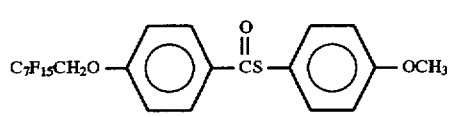

I-3

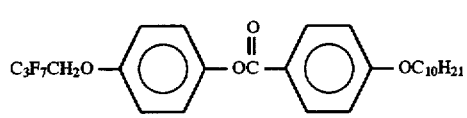

I-4

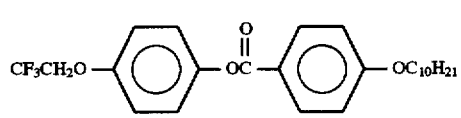

I-5

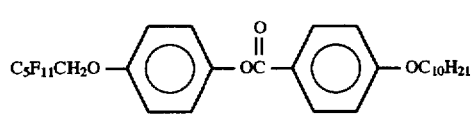

I-6

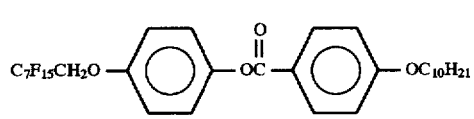

I-7

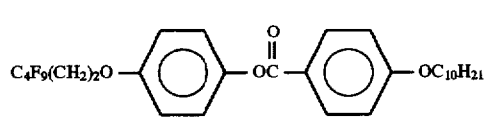

I-8

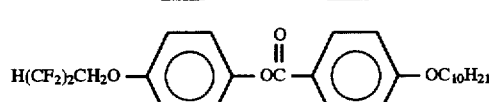

I-9

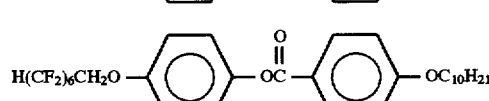

I-10

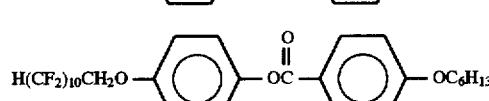

I-11

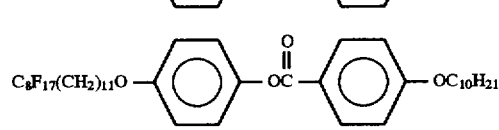

I-12

-continued
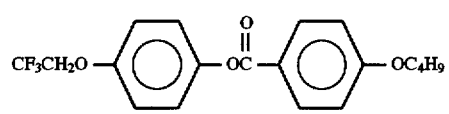 I-13
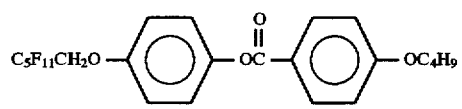 I-14
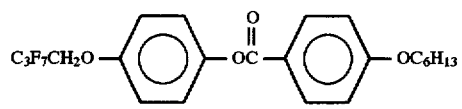 I-15
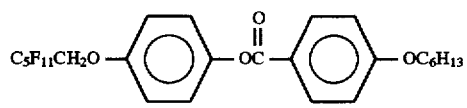 I-16
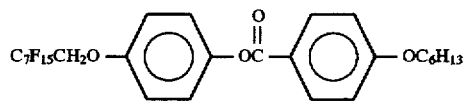 I-17
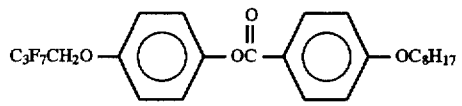 I-18
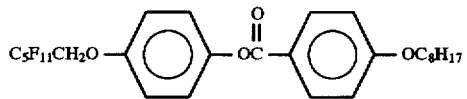 I-19
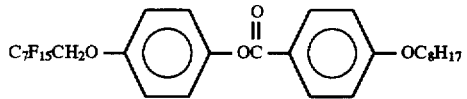 I-20
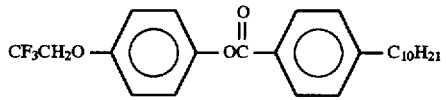 I-21
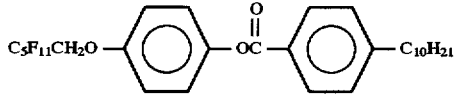 I-22
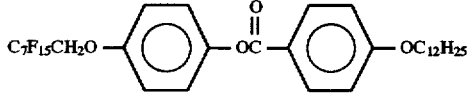 I-23
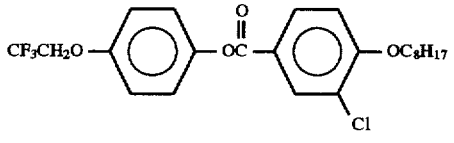 I-24
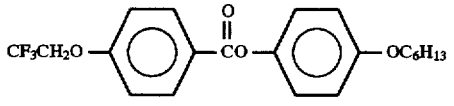 I-25
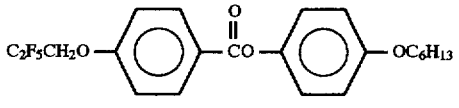 I-26

-continued
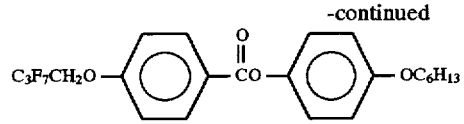 I-27
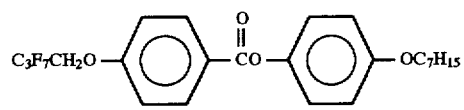 I-28
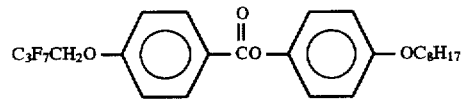 I-29
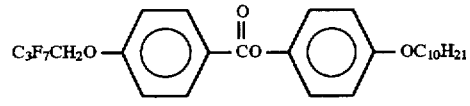 I-30
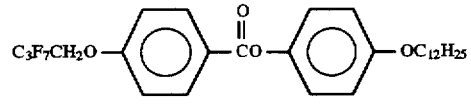 I-31
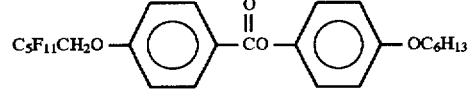 I-32
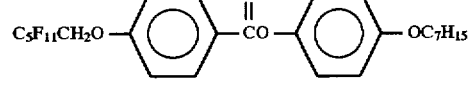 I-33
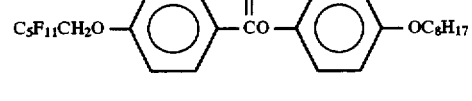 I-34
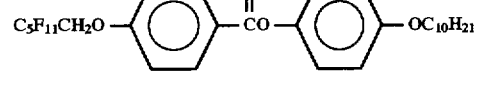 I-35
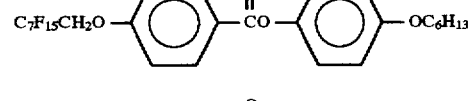 I-36
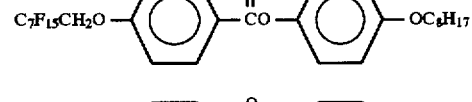 I-37
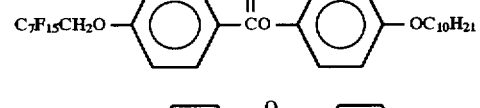 I-38
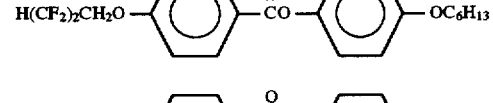 I-39
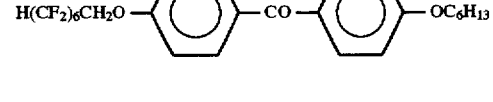 I-40

-continued
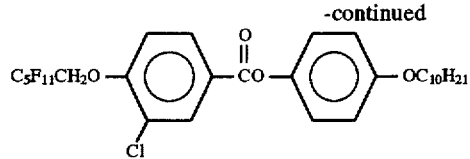
I-41
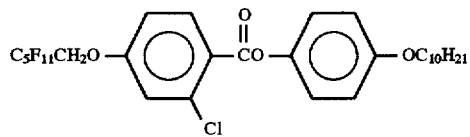
I-42
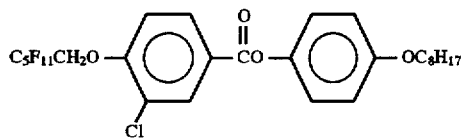
I-43
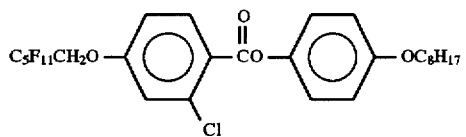
I-44
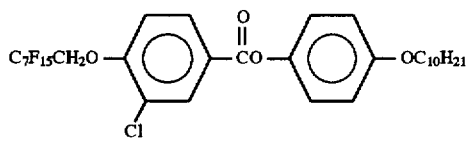
I-45
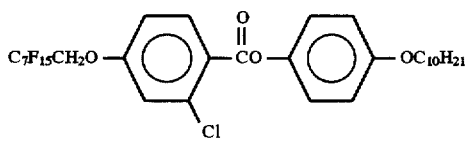
I-46
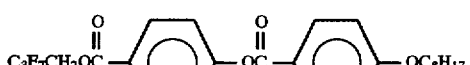
I-47
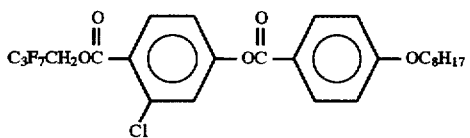
I-48
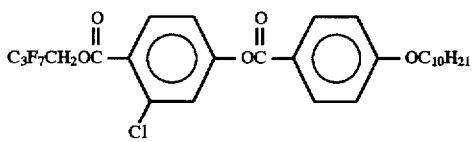
I-49
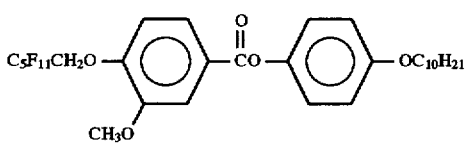
I-50
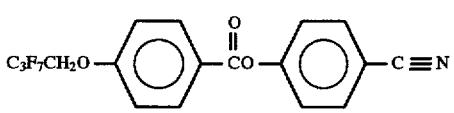
I-51
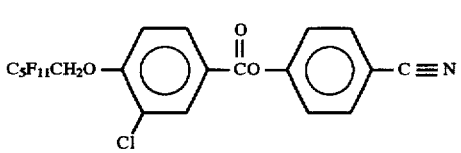

-continued
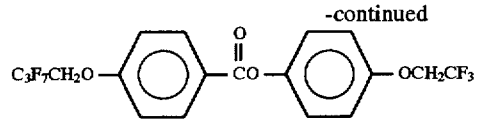 I-52
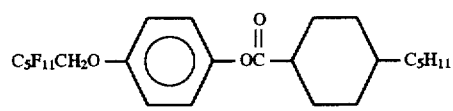 I-53
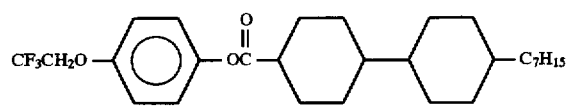 I-54
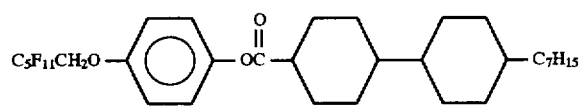 I-55
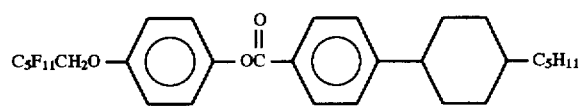 I-56
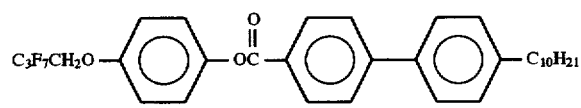 I-57
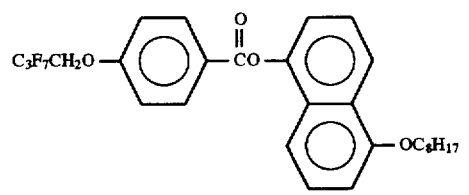 I-58
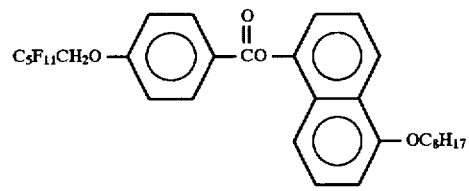 I-59
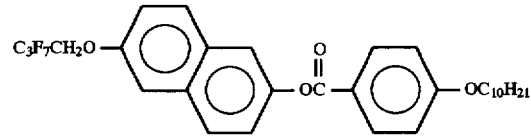 I-60
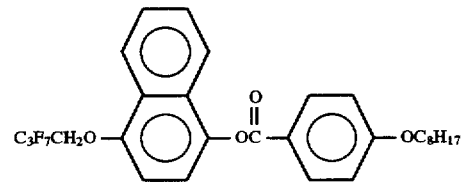 I-61
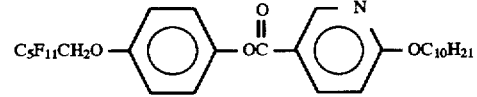 I-62
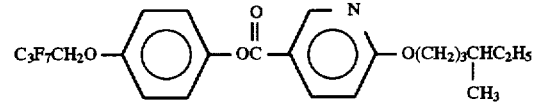 I-63

-continued
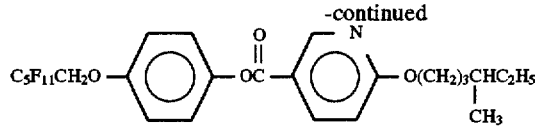  I-64
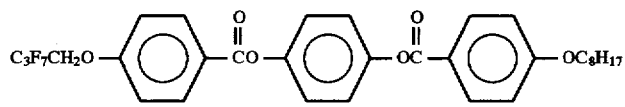  I-65
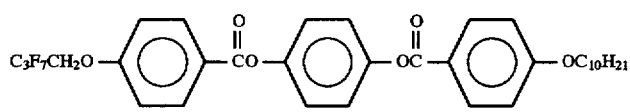  I-66
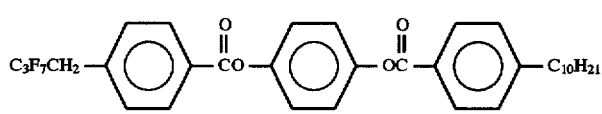  I-67
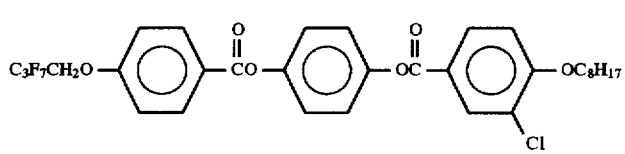  I-68
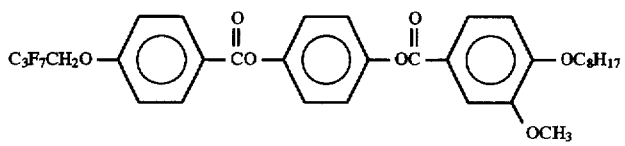  I-69
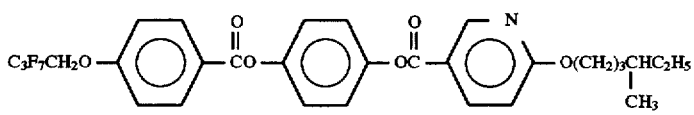  I-70
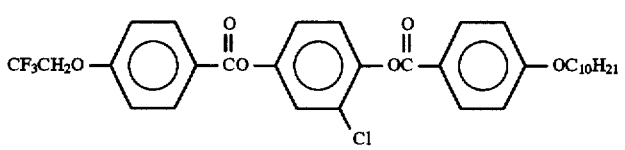  I-71
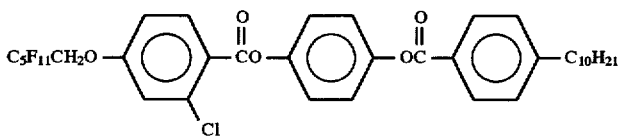  I-72
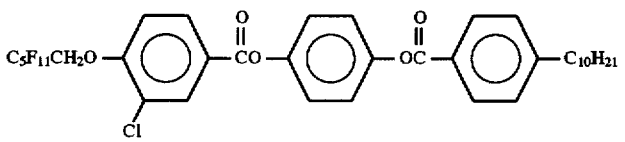  I-73
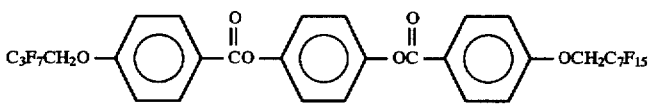  I-74
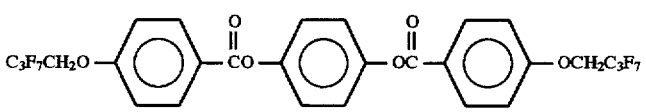  I-75
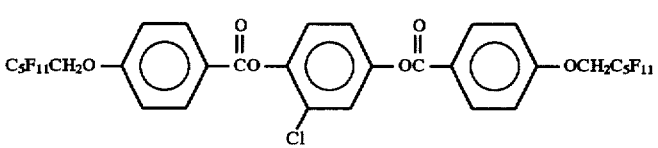  I-76

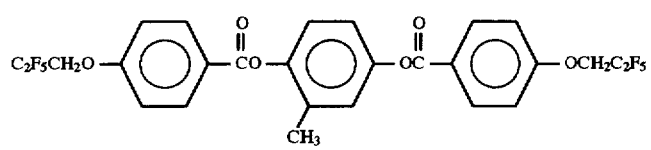 I-77
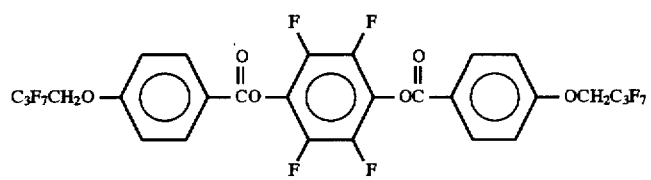 I-78
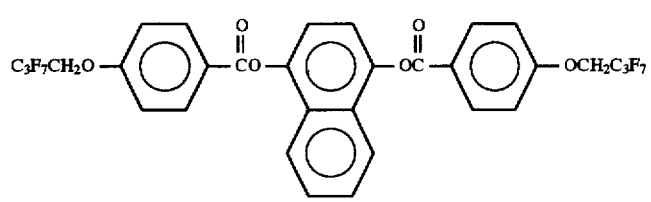 I-79
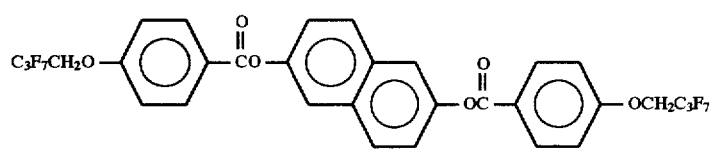 I-80
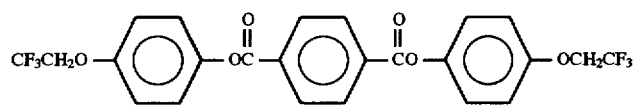 I-81
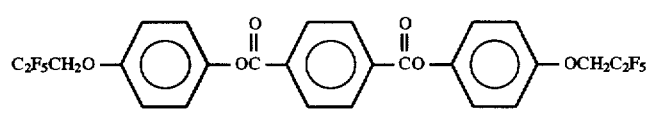 I-82
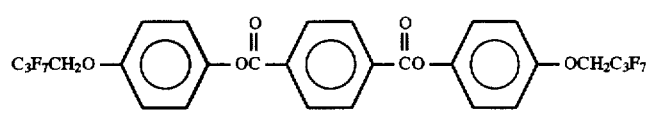 I-83
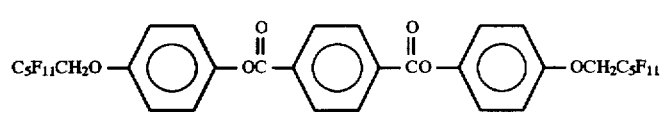 I-84
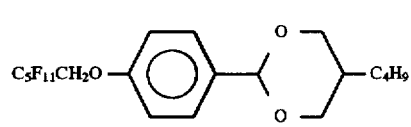 I-85
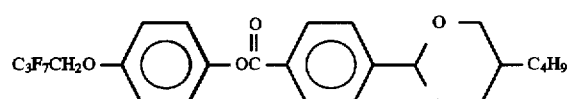 I-86
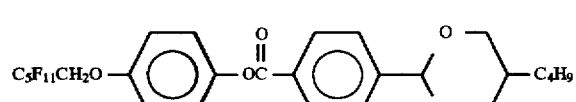 I-87
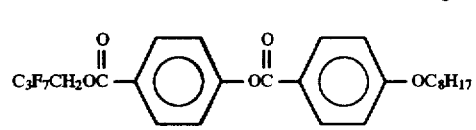 I-88

-continued
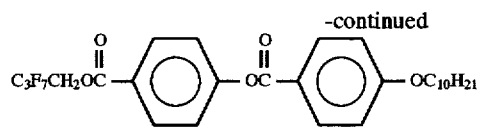 I-89
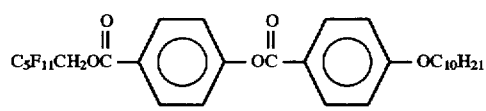 I-90
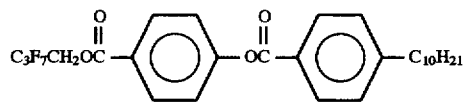 I-91
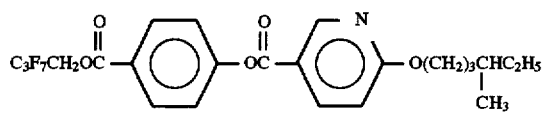 I-92
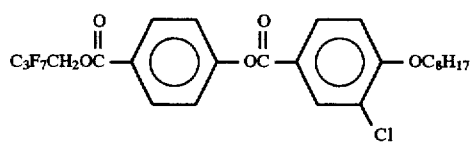 I-93
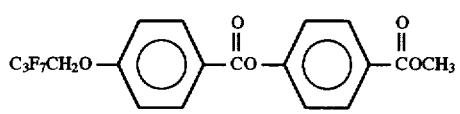 I-94
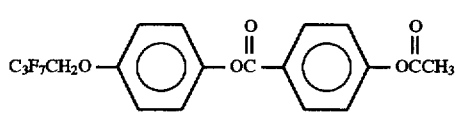 I-95
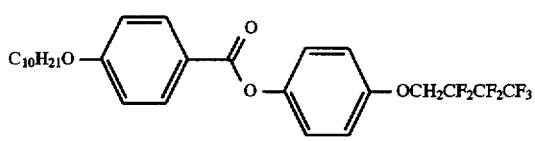 I-96
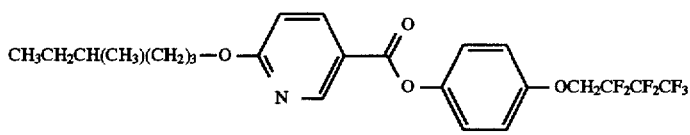 I-97
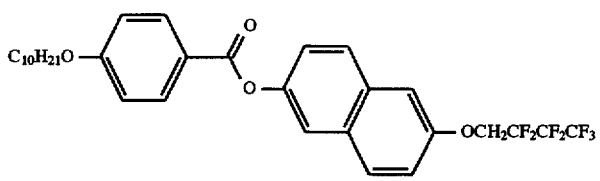 I-98
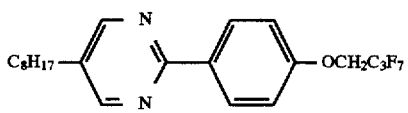 I-99
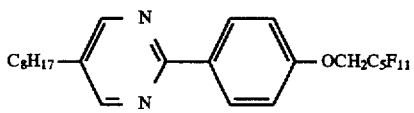 I-100
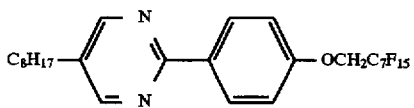 I-101

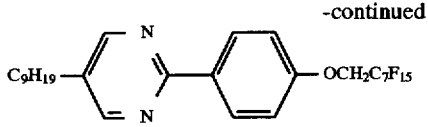
I-102
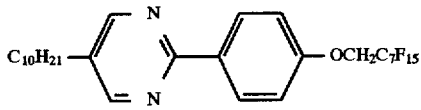
I-103
The mesomorphic compound represented by the formula (II) may be synthesized through processes similar to those descried in JP-A (Kohyo) 7-506368 and WO93/22396. Specific examples of such mesomorphic compounds of the formula (II) may include those (Example Compound Nos. II-1 to II-45) shown below.
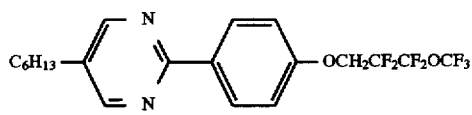
II-1
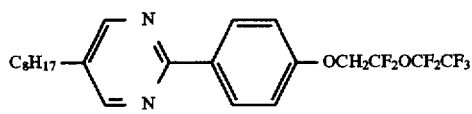
II-2
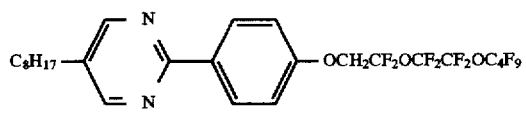
II-3
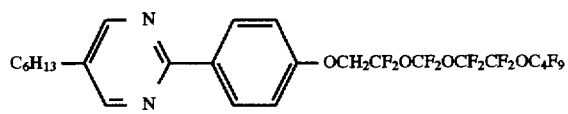
II-4
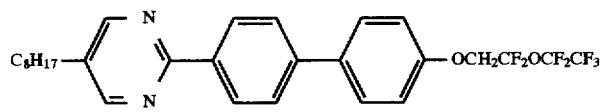
II-5
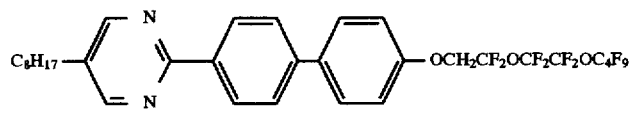
II-6
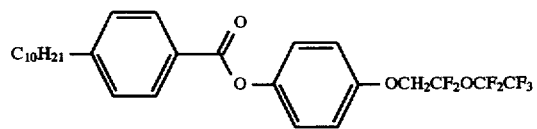
II-7
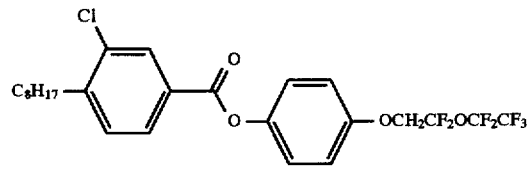
II-8
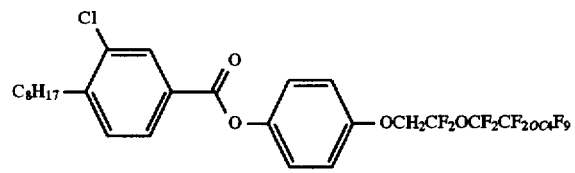
II-9

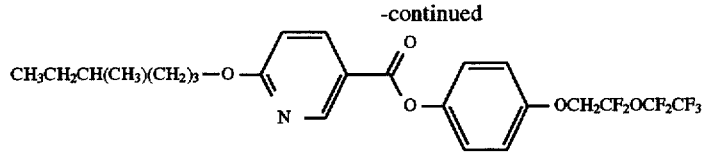
II-10
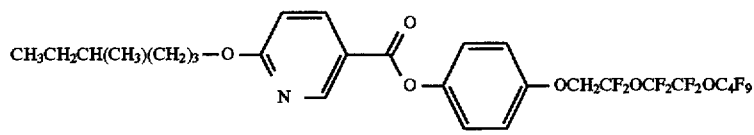
II-11
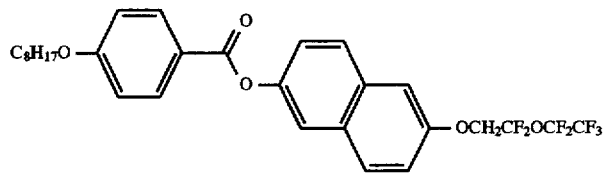
II-12
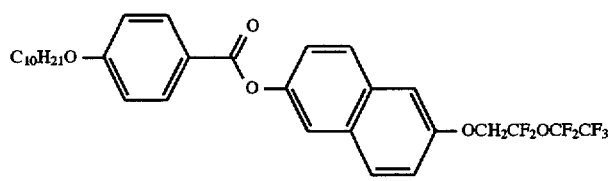
II-13
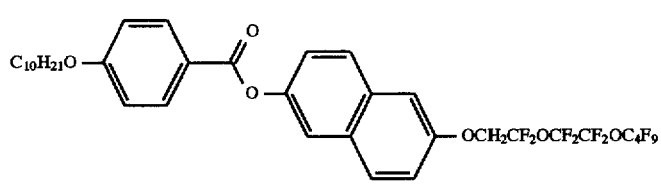
II-14
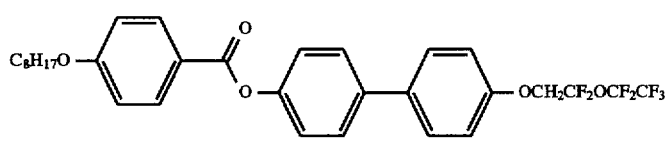
II-15
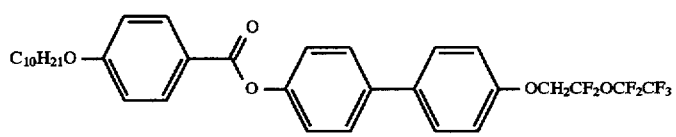
II-16
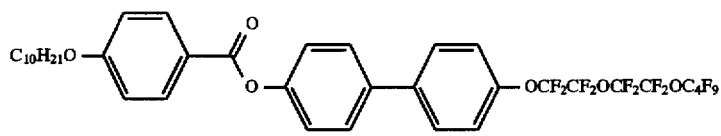
II-17
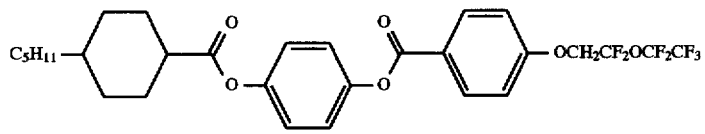
II-18
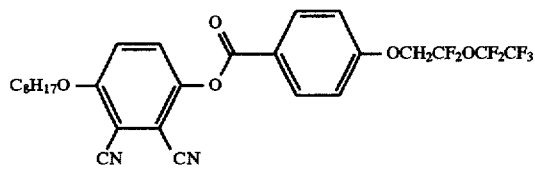
II-19

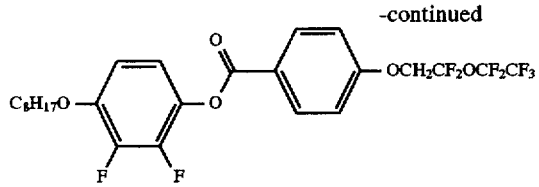
II-20
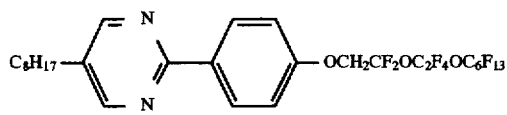
II-21
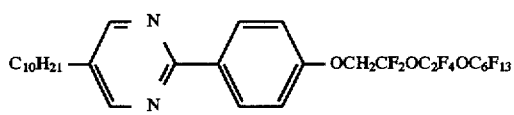
II-22
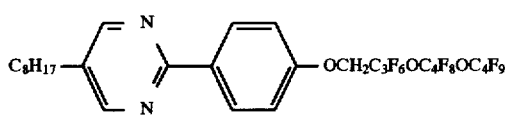
II-23
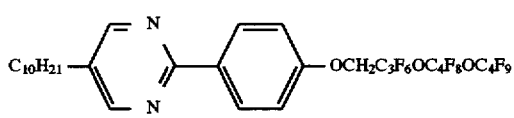
II-24
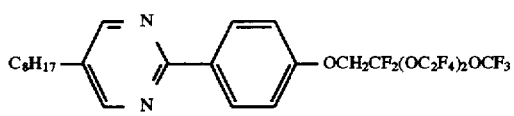
II-25
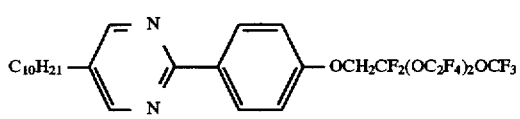
II-26
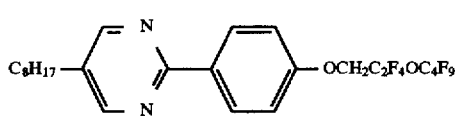
II-27
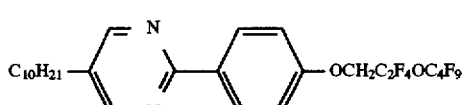
II-28
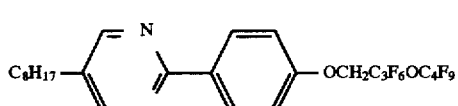
II-29
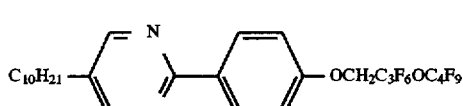
II-30
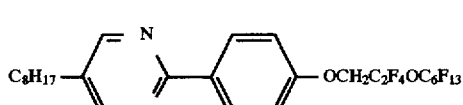
II-31
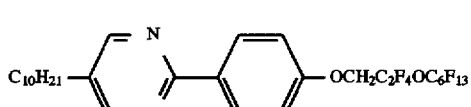
II-32

-continued
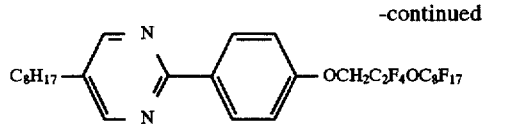
II-33
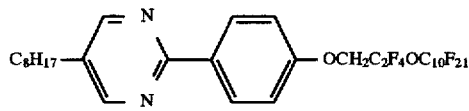
II-34
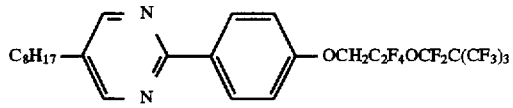
II-35
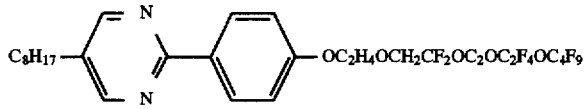
II-36
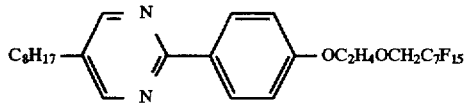
II-37
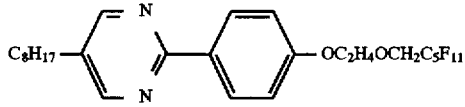
II-38
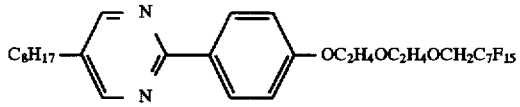
II-39
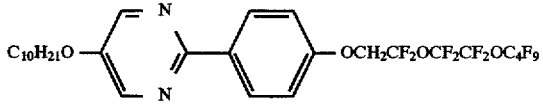
II-40
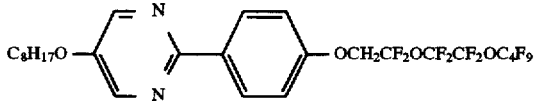
II-41
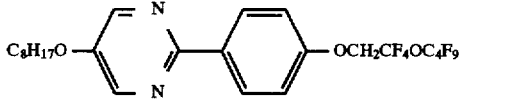
II-42
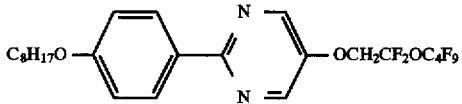
II-43
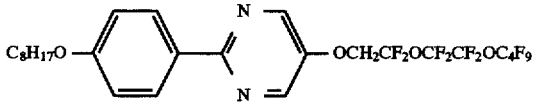
II-44
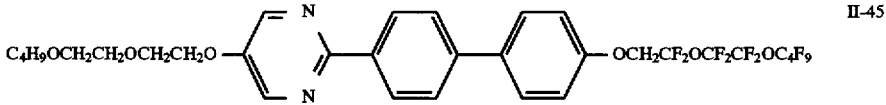
II-45
The liquid crystal composition used in the present invention may contain at least one species of an optically active (chiral) compound when formulated as a chiral smectic liquid crystal composition.
Examples of the optically active compound may include those (Ex. Comp. Nos. 1–75) shown below.

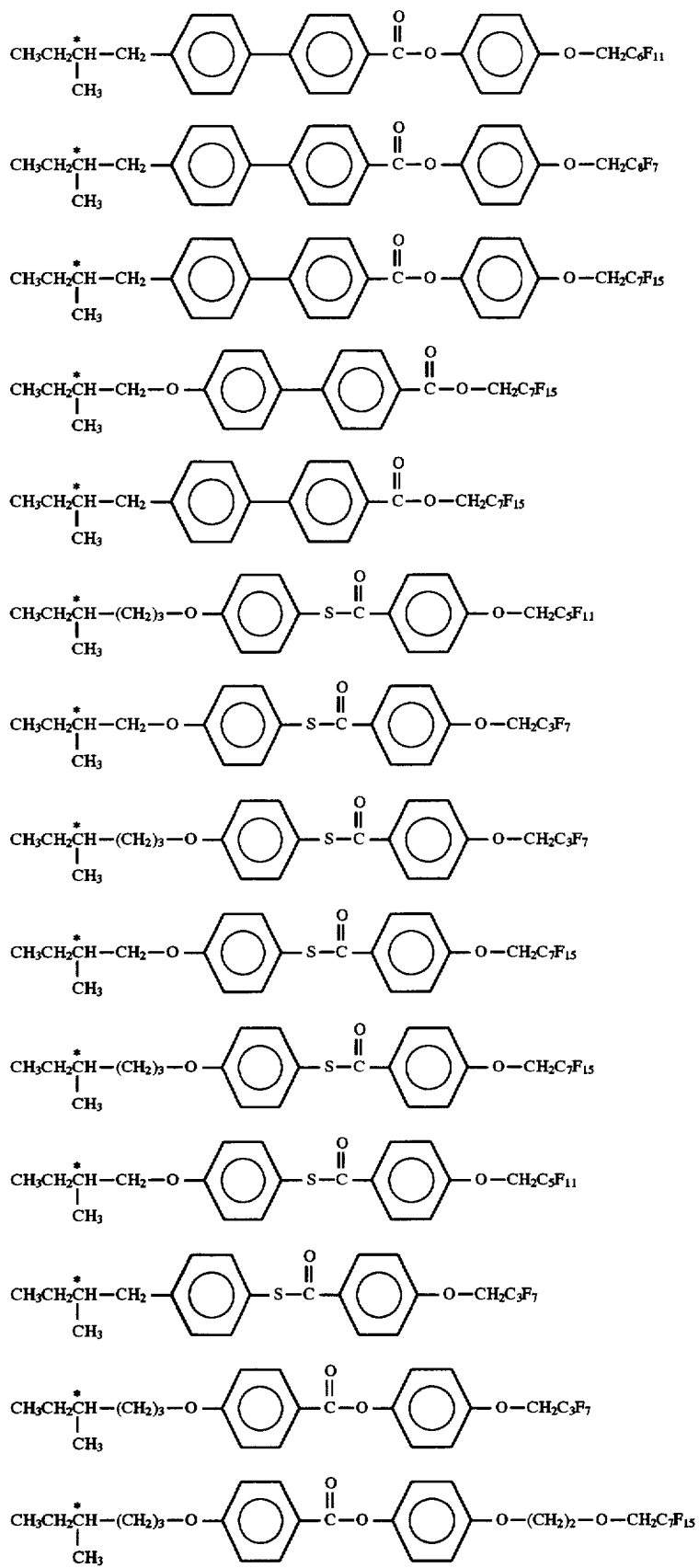

-continued

15. CH₃CH₂C*H(CH₃)—CH₂—O—⟨C₆H₄⟩—O—C(=O)—⟨C₆H₄⟩—O—CH₂C₅F₁₁

16. CH₃CH₂C*H(CH₃)—CH₂—O—⟨C₆H₄⟩—O—C(=O)—⟨C₆H₄⟩—O—CH₂C₇F₁₅

17. CH₃CH₂C*H(CH₃)—(CH₂)₃—O—⟨C₆H₄⟩—O—C(=O)—⟨C₆H₄⟩—O—CH₂C₃F₇

18. CH₃CH₂C*H(CH₃)—(CH₂)₃—O—⟨C₆H₄⟩—O—C(=O)—⟨C₆H₄⟩—O—CH₂C₅F₁₁

19. CH₃CH₂C*H(CH₃)—(CH₂)₃—O—⟨C₆H₄⟩—O—C(=O)—⟨C₆H₄⟩—O—CH₂C₇F₁₅

20. CH₃CH₂C*H(CH₃)—CH₂—O—C(=O)—⟨C₆H₄⟩—O—C(=O)—⟨C₆H₄⟩—O—CH₂C₃F₇

21. CH₃CH₂C*H(CH₃)—(CH₂)₃—O—⟨C₆H₄⟩—C(=O)—O—⟨C₆H₄⟩—O—CH₂C₅F₁₁

22. CH₃CH₂C*H(CH₃)—(CH₂)₃—O—⟨C₆H₄⟩—C(=O)—O—⟨C₆H₄⟩—O—CH₂C₇F₁₅

23. CH₃CH₂C*H(CH₃)—(CH₂)₃—O—⟨C₆H₄⟩—C(=O)—O—⟨C₆H₄⟩—O—(CH₂)₂C₄F₉

24. CH₃CH₂C*H(CH₃)—(CH₂)₃—O—⟨C₆H₄⟩—C(=O)—O—⟨C₆H₄⟩—O—CH₂(CF₂)₆H

25. CH₃—CH₂—C*H(CH₃)—CH₂—O—⟨C₆H₄⟩—C(=O)—O—⟨C₆H₄⟩—O—CH₂C₇F₁₅

26. CH₃—CH₂—C*H(CH₃)—CH₂—O—⟨C₆H₄⟩—C(=O)—O—⟨C₆H₄⟩—O—CH₂C₅F₁₁

27. CH₃CH₂C*H(CH₃)CH₂—O—⟨C₆H₄⟩—C(=O)—O—⟨C₆H₄⟩—O—CH₂C₅F₁₁

28. CH₃CH₂C*H(CH₃)CH₂—O—CH₂—⟨C₆H₄⟩—C(=O)—O—⟨C₆H₄⟩—O—CH₂—C₇H₁₅

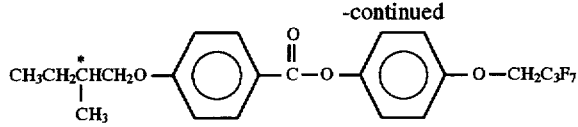
29
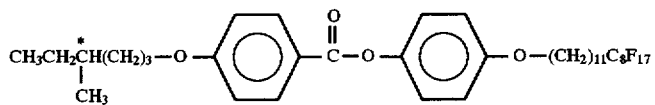
30
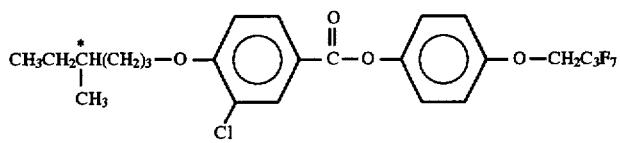
31
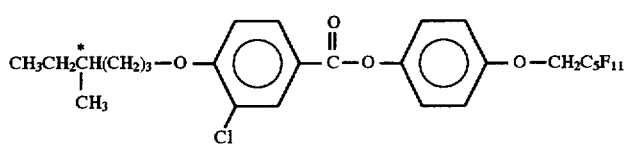
32
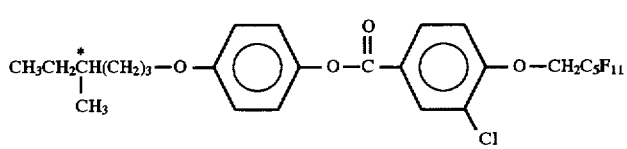
33
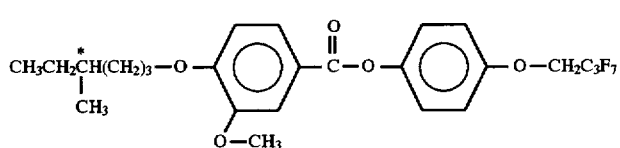
34
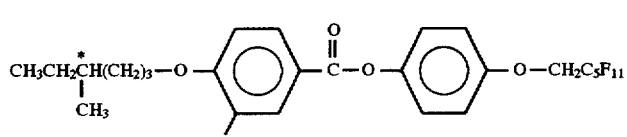
35
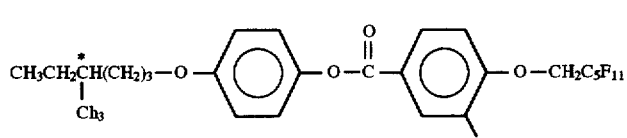
36
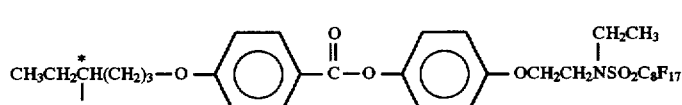
37
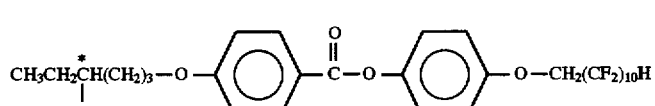
38
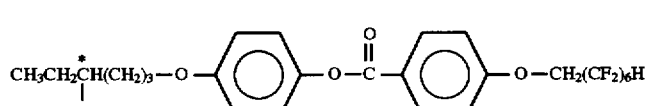
39
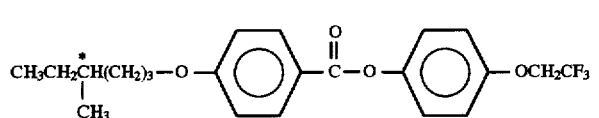
40

-continued
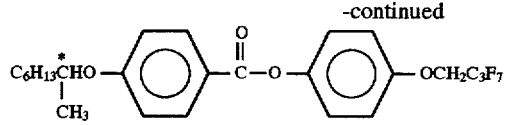
41
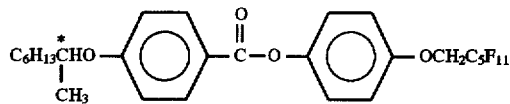
42
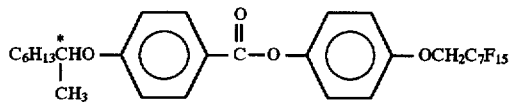
43
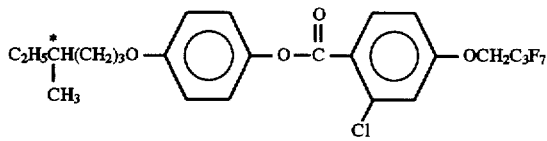
44
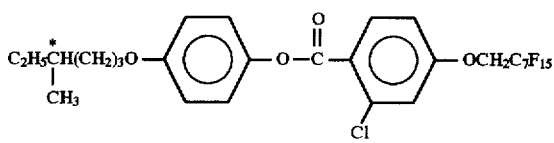
45
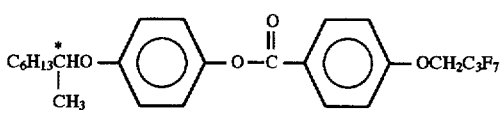
46
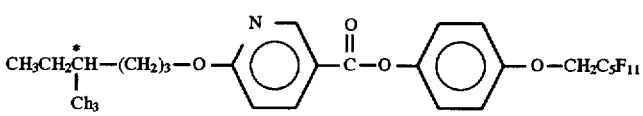
47
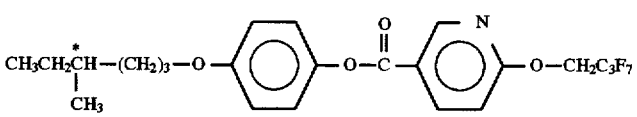
48
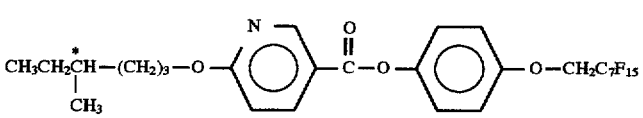
49
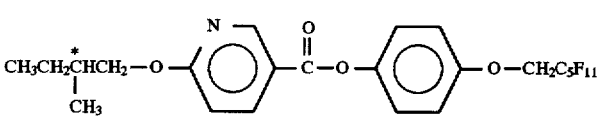
50
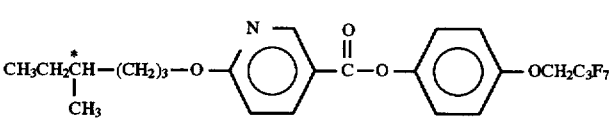
51
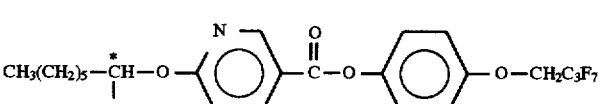
52
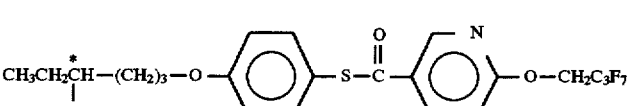
53

-continued
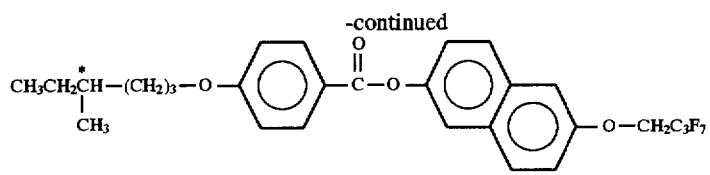
54
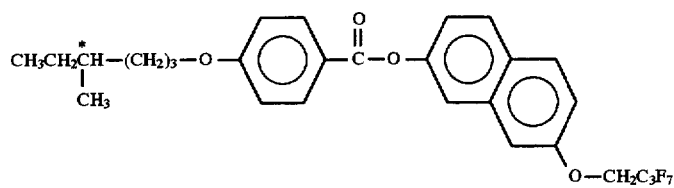
55
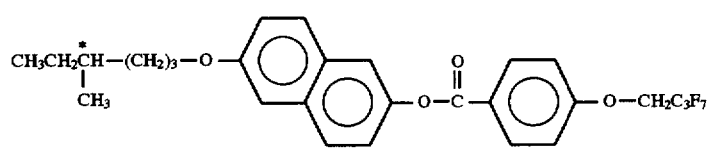
56
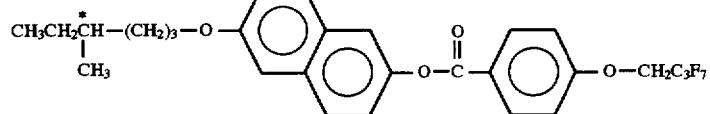
57
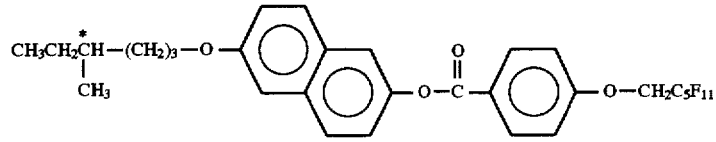
58
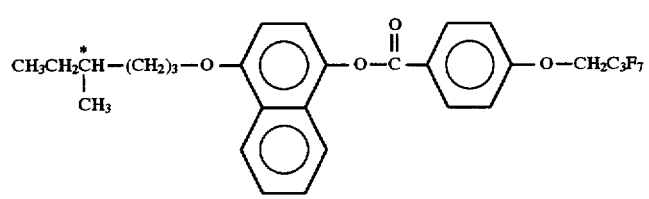
59
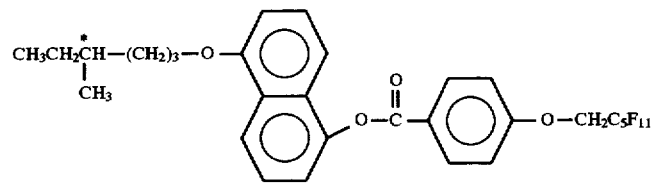
60
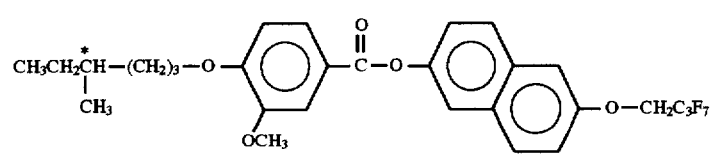
61
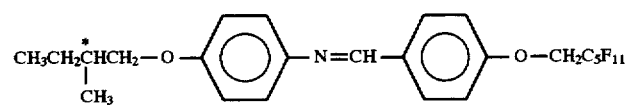
62
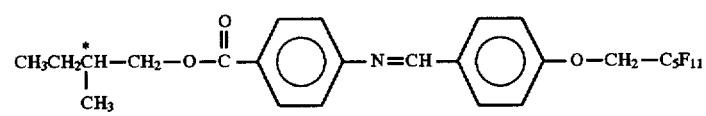
63
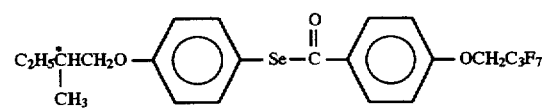
64
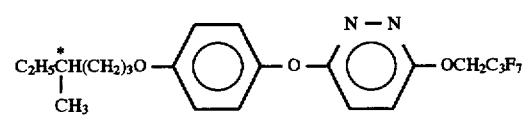

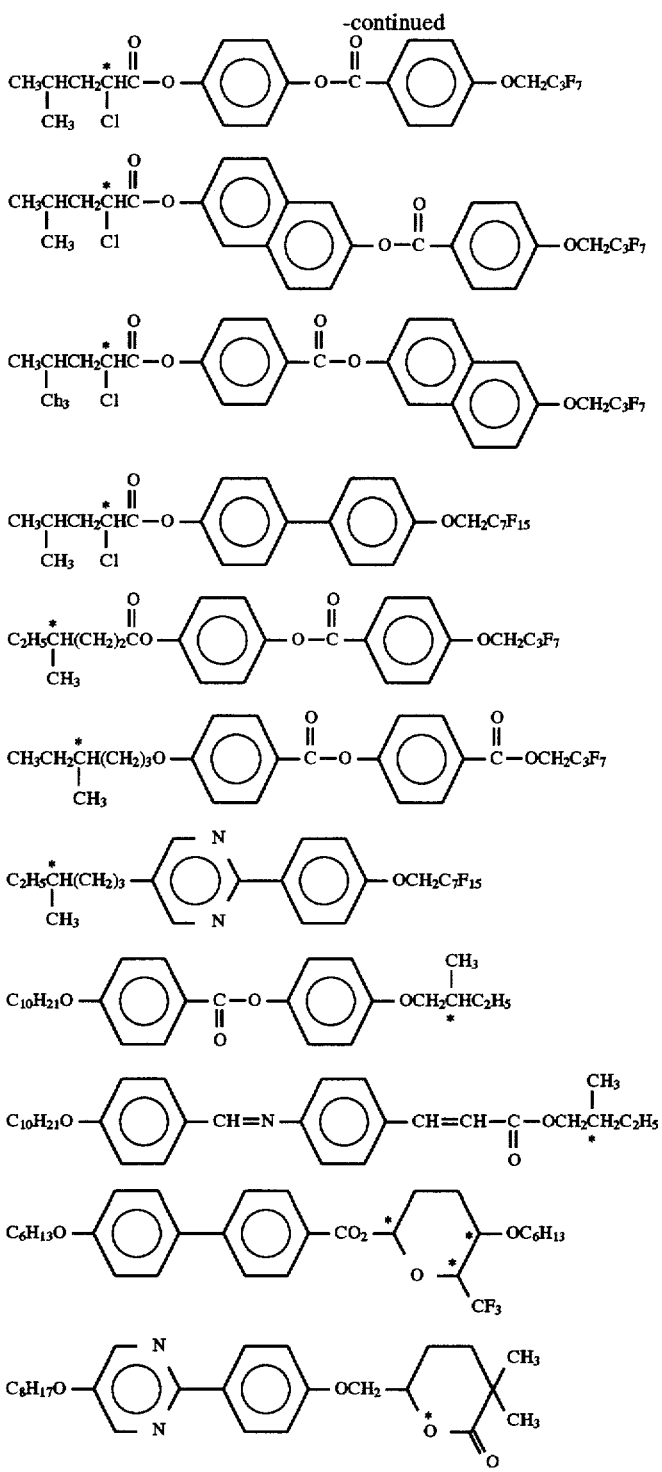

These optically active compounds may be used singly or in combination of plural species in a chiral smectic liquid crystal composition as a chiral dopant or a main component.

The liquid crystal composition used in the present invention may further contain at least one species of other liquid crystal (mesomorphic) compounds including chiral compounds and achiral (non-chiral) compounds in view of, e.g., compatibility (mutually solubility) with other components of the composition or control of a resultant layer spacing.

The liquid crystal composition used in the invention may further contain additives such as an antioxidant, an ultraviolet ray-absorbing agent, dyes and pigments.

Then, specific examples of a recurring unit of the formula P-1 constituting a polyamide (amide polymer) as described above may include those (Ex. Comp. Nos. 1-1 to 1-6) shown below.

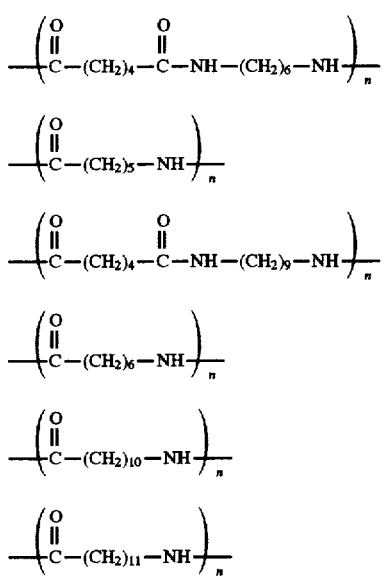

Specific examples of a recurring unit of the formula P-2 constituting a pyridine-based polymer as described above may include those (Ex. Comp. Nos. 2-1 to 2-10) shown below.

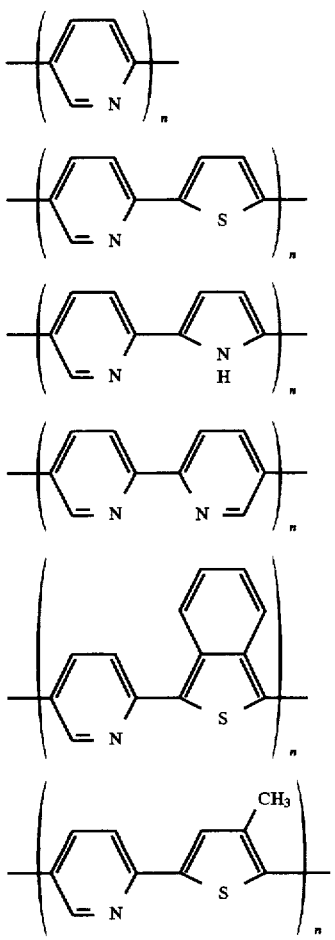

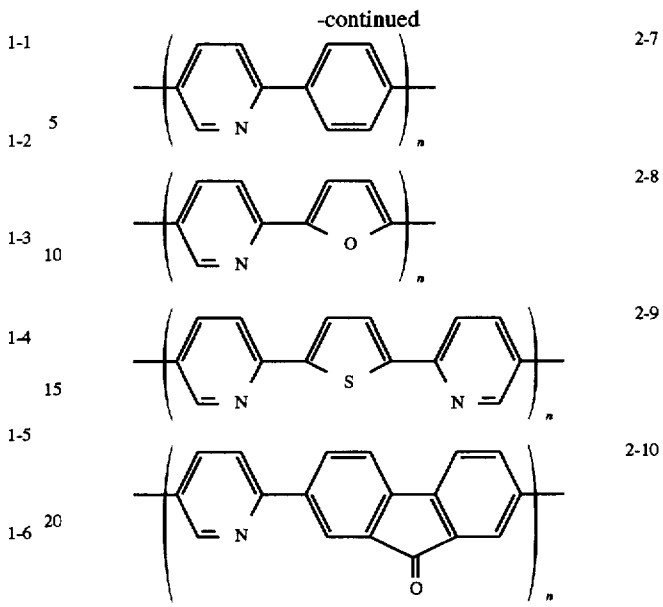

The liquid crystal device according to the present invention may preferably be used as a main element of a liquid crystal apparatus, particularly a display element (e.g., a display panel) of a liquid crystal display apparatus, in combination with other elements, such as a drive circuit and a light source.

Hereinbelow, the present invention will be described more specifically based on Examples and Comparative Examples.

In the following examples and comparative examples, evaluation of several items is effected in the following manners.

[Uniform alignment characteristic]

The uniform alignment characteristic is evaluated as a parameter Td standardized by a transmittance (amount of transmitted light) under para-nicol condition as follows.

$$Td(\%)=(Ic/Ip)\times 100,$$

wherein an Ic denotes a transmittance at the darkest position under cross-nicol condition and an Ip denotes a transmittance at the darkest position under paranicol condition.

For measurement of a transmittance, a sample chiral smectic liquid crystal cell is mounted on a hot stage ("FP-82", available from Mettler Co.) temperature-controlled by a temperature controller ("FP-80HT", available from Mettler Co.), and is once heated to isotropic phase temperature (90° C.) and is gradually cooled to smectic A phase (SmA) temperature (50° C.) at a cooling rate of 1° C./min. At the SmA temperature, the liquid crystal cell is subjected to measurement of a transmittance (Ic) at the darkest position in a cross-nicol relationship between a pair of polarizers and a transmittance (Ip) at the darkest position in a para-nicol relationship between the polarizers, respectively.

In order to provide a good uniform alignment characteristic, the Td may preferable be at most 1%, more preferably be a small value closer to 0% and has a theoretical upper value of 100% (i.e., Ic=Ip).

[Volume resistivity]

The volume resistivity is determined in the following manner.

A substrate ("#7059", available from Corning Co.) is washed in succession with trichloroethylene, acetone, ethanol and pure water by ultrasonic cleaning and is washed with water by running water cleaning, followed by drying in a dry nitrogen atmosphere. The substrate is then coated with a solution of material(s) for an alignment control layer (identical to those used in Examples and Comparative Examples) by spin coating under prescribed conditions, followed by drying and hot-baking to form a ca. 100 Å-thick alignment control film. On the alignment control film, ca. 300 Å-thick gold electrons in a form of teeth of a comb are vapor-deposited by resistance heating to prepare a sample substrate.

The sample substrate is subjected to measurement of a resistance of an objective alignment control film in a sheet extension direction by using a microammeter in an environment of 25° C. and 55%RH to obtain a volume resistivity.

The measurement of a resistance of the alignment control film may be performed in its thickness direction because a resultant value is substantially identical to that in ia sheet extension direction in many cases.

[Hysteresis voltage (difference in inversion threshold voltage)]

The hysteresis voltage ($V_H$) is determined by the following equation:

$$V_H(\text{volt}) = |V_{12} - V_{21}|,$$

wherein a $V_{12}$ denotes an inversion threshold voltage (from a first stable state ($U_1$ state) to a second stable state ($U_2$ state) providing a transmittance of 50% in a voltage (V)–transmittance (T) curve when a transmittance in a $U_1$ state is taken as 0% and a transmittance in a $U_2$ state is taken as 100%, and a $V_{21}$ denotes an inversion threshold voltage (from a $U_2$ state to a $U_1$ state) providing a transmittance of 50%. In this regard, the $U_1$ state is defined as a state such that a liquid crystal material has a spontaneous polarization in a direction from a mixture alignment control film (first film) to an alignment control film using a silane coupling agent or a mixture alignment control film (second film) and the $U_2$ state is defined as a state such that a liquid crystal material has a spontaneous polarization in a reverse direction.

The V-T curve is prepared in the following manner.

Figure 2:
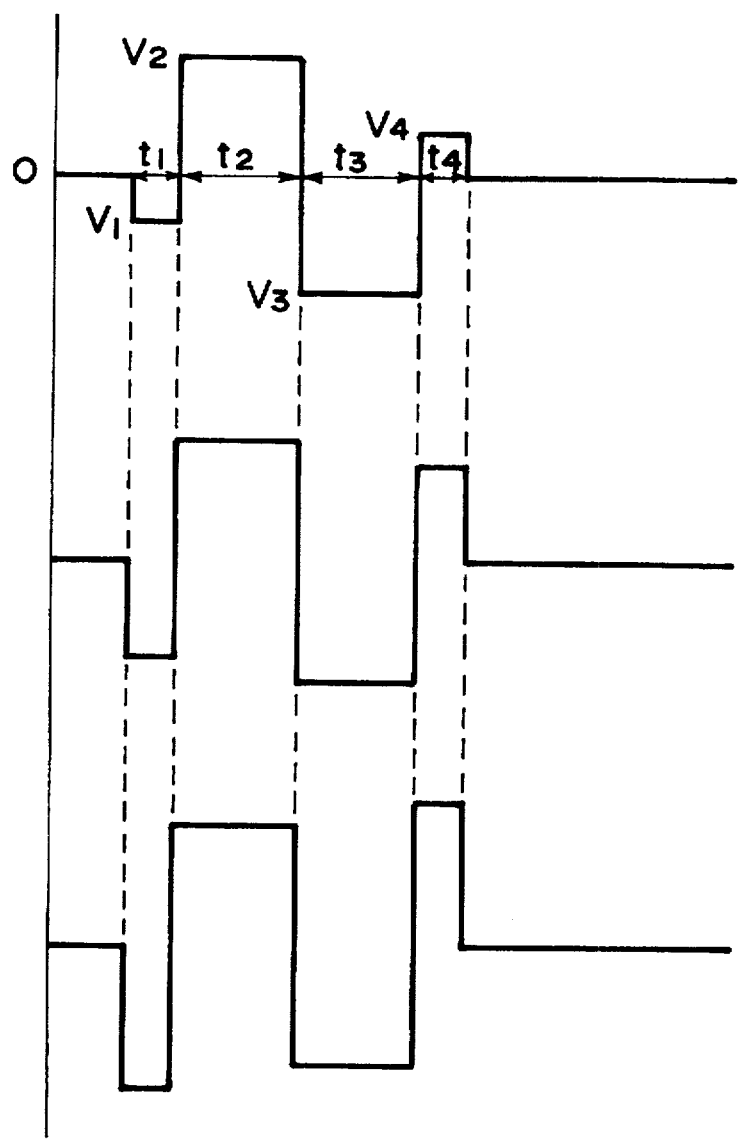
FIG. 2 shows an embodiment of a set of unit driving waveforms for measurement of a difference in (hysteresis of) inversion threshold voltage between two stable states in a liquid crystal device.

FIG. 2 shows a set of symmetric bipolar pulses for measuring a transmittance under application of varying a voltages, wherein a $V_1$ is a varying $U_1$ state-forming pulse applied for a period $t_1$ ($V_1$=0 to –40 V, $t_1$=10 μsec) a $V_2$ denotes a $U_2$ state-forming pulse (rest pulse) applied for a period $t_2$ ($V_2$=+20 V, $t_2$=20 μsec), a $V_3$ denotes a $U_1$ state-forming pulse (reset pulse) applied for a period $t_3$ ($V_3$=–20 V, $t_3$=20 μsec), and a $V_4$ denotes a varying $U_2$ state-forming pulse (writing pulse) applied for a period $t_4$ ($V_4$=0 to +40 V, $t_4$=10 μsec). For example, an electric field is applied in a direction from the first film side to the second film side by using the voltages $V_1$ and $V_3$.

For measurement, each of symmetric bipolar pulses shown in FIG. 2 is applied for about 1 second while changing a voltage $V_4$ ($V_1$) between 0 V to 40 V (as absolute value) (i.e., 0 V→40 V→0 V) at a rate of 4 V/min. In each pulse application, a transmittance at a time after 800 msec from $V_4$ voltage application is measured to provide a V-T curve (hysteresis curve).

From the V-T curve, the inversion threshold voltages $V_{12}$ and $V_{21}$ each providing a transmittance of 50% are obtained to determine a hysteresis voltage (difference in inversion threshold voltages) $V_H(=|V_{12}-V_{21}|)$.

EXAMPLE 1

Two 1.1 mm-thick glass substrates each provided with a 1500 Å-thick ITO (indium tin oxide) film as a transparent electrode by sputtering were prepared.

One substrate (first substrate) was coated with 0.5 wt. %-solution in formic acid of a polyamide (nylon 66, polymerization degree=5,000) and a pyridine-based polymer (polythiophenepyridine (PTpy), polymerization degree=2,000) mixed in a solid content ratio of 25:75 by weight by spin coating at 2000 rpm for 20 sec., followed by pre-drying at 80° C. for 5 minutes and hot-baking at 180° C. for 1 hour in an oven to form a ca. 100 Å-thick alignment control film.

The alignment control film provided a volume resistivity of $5 \times 10^7$ ohm.cm as measured according to the above-described method.

The alignment control film was subjected to rubbing (as a uniaxial aligning treatment) under the following conditions.

Rubber roller: 8 cm-dia. roller about which a nylon cloth was wound.

Rotation speed: 1000 rpm.

Pressing depth: 0.4 mm.

Substrate moving speed: 5 mm/sec.

Rubbing: 3 times (strokes) in one direction.

Then, onto the above (first) substrate, a 0.01 wt. %-solution in isopropyl alcohol (IPA) of silica beads of 2.0 μm in average diameter was applied at a dispersion density of ca. 300 particles/mm² by spin coating at 1500 rpm for 10 sec.

The other substrate (second substrate) was coated with a 0.5 wt. % solution in ethanol of a silane coupling agent ("ODS-E", available from Chisso K.K.) for homeotropic (vertical) aligning treatment by spin coating at 2000 rpm for 20 sec. and dried in an oven at 180° C. for 1 hour to form an alignment control film, followed by coating with a thermosetting liquid adhesive by printing process.

These two substrates were applied to each other, followed by hot curing at 150° C. for 90 min. in an oven to form a blank cell.

Into the blank cell, a liquid crystal composition described below was injected at an isotropic phase temperature (100° C.) under reduced pressure (10 Pa), followed by gradual cooling to a room temperature (chiral smectic C phase) to prepare a liquid crystal device.

The liquid crystal composition was prepared by mixing the following compounds in the indicated proportions.

| Structural formula | wt. parts |
|---|---|
| 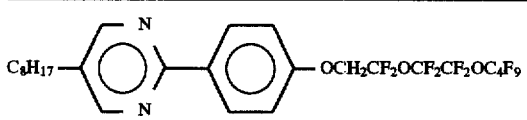 | 46.4 |

-continued

| Structural formula | wt. parts |
|---|---|
| C₈H₁₇—[pyrimidine]—[phenyl]—OCH₂C₃F₆OC₄F₉ | 15.5 |
| C₈H₁₇—[pyrimidine]—[phenyl]—OCH₂CF₂(OC₂F₄)₂OCF₃ | 30.9 |
| C₆H₁₃O—[phenyl]—[phenyl]—CO₂—*CH(CF₃)—O—*CH—OC₆H₁₃ | 5.2 |
| C₈H₁₇O—[pyrimidine]—[phenyl]—OCH₂—*CH—O—C(=O)—C(CH₃)₂—CH₃ | 2.0 |

The liquid crystal composition showed the following phase transition series.

Phase transition temperature (°C.)

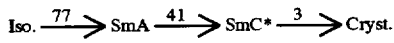

Iso. $\xrightarrow{77}$ SmA $\xrightarrow{41}$ SmC* $\xrightarrow{3}$ Cryst.

Iso.: isotropic phase.
SmA: smectic A phase.
SmC*: chiral smectic C phase, and
Cryst.: crystal phase.

The liquid crystal composition provided the following properties.

| | 10° C. | 30° C. |
|---|---|---|
| Tilt angle Ⓗ (deg.) | 27.2 | 24.4 |
| Spontaneous polarization Ps (nC/cm²) | −45.9 | −31.1 |

The liquid crystal device was subjected to measurement of transmittance (Ic and Ip) and inversion threshold voltages of from a first stable state to a second stable state ($V_{12}$) and from a second stable state to a first stable state ($V_{21}$) in accordance with the above-described methods, respectively, whereby a Td [(Ic/Ip)×100] of 0.50% and a difference ($V_H$=|$V_{12}$−$V_{21}$|) therebetween (hysteresis voltage) of 0.3 V were obtained.

COMPARATIVE EXAMPLE 1

A liquid crystal device was prepared and evaluated in the same manner as in Example 1 except that a 1.0 wt. %-solution in formic acid of nylon 66 (polymerization degree=5000) was used instead of the 0.5 wt. %-solution in formic acid of nylon 66 and PTpy (used in Example 1) and was spin-coated at 3000 rpm for 20 sec. to form a ca. 100 Å-thick alignment control film.

The nylon 66 alignment control film provided a volume resistivity of 2×10¹⁰ ohm.cm and the liquid crystal device provided a Td of 0.45% and a difference in inversion threshold voltage ($V_H$) of 1.5 V.

COMPARATIVE EXAMPLE 2

A liquid crystal device was prepared and evaluated in the same manner as in Example 1 except that a 1.0 wt. %-solution in formic acid of PTpy (polythiophenepyridine, polymerization degree=2000) was used instead of the 0.5 wt. %-solution in formic acid of nylon 66 and PTpy (used in Example 1) and was spin-coated at 1000 rpm for 20 sec. to form a ca. 100 Å-thick alignment control film.

The PTpy alignment control film provided a volume resistivity of 9×10⁹ ohm.cm and the liquid crystal device provided a Td of 1.85% and a difference in inversion threshold voltage ($V_H$) of 1.0 V.

COMPARATIVE EXAMPLE 3

A liquid crystal device was prepared and evaluated in the same manner as in Example 1 except that a ca. 100 Å-thick alignment control film was formed on a first substrate by effecting coating with a 1.0 wt. %-solution of a polyamic acid as a polyimide precursor ("LP-64", available from Toray K.K.) in an N-methylpyrrolidone/n-butyl cellosolve (=2/1) mixture solvent by spin coating at 2700 rpm for 20 sec., followed by pre-drying at 80° C. for 5 min. and hot-curing at 200° C. for 1 hour.

The polyimide alignment control film provided a volume resistivity of 2×10¹¹ ohm.cm and the liquid crystal device provided a Td of 0.07% and a $V_H$ of 2.0 V.

EXAMPLE 2

A liquid crystal device was prepared and evaluated in the same manner as in Example 1 except that the PTpy (polythiophenepyridine) was changed to polypyridine (Ppy, polymerization degree=2000).

The alignment control film (a mixture film of Ppy and nylon 66) provided a volume resistivity of 8×10⁷ ohm.cm. Further, the liquid crystal device provided a Td of 0.20% and a $V_H$ of 0.4 V.

The evaluation results in Example 1, Comparative Examples 1-3, and Example 2 are summarized in Table 1.

TABLE 1

| Example No. | Resistivity (ohm.cm) | $V_H$ at 10° C. (V) |
| --- | --- | --- |
| Ex. 1 | $5 \times 10^7$ | 0.3 |
| Comp. Ex. 1 | $2 \times 10^{10}$ | 1.5 |
| " 2 | $0.9 \times 10^{10}$ | 1.0 |
| " 3 | $2 \times 10^{11}$ | 2.0 |
| Ex. 2 | $8 \times 10^7$ | 0.4 |

EXAMPLE 3

Two 1.1 mm-thick glass substrates each provided with a 1500 Å-thick ITO (indium tin oxide) film as a transparent electrode by sputtering were prepared.

Each of the substrates (first and second substrates) was coated with 0.5 wt. %-solution in formic acid of a polyamide (nylon 66, polymerization degree=5,000) and a pyridine-based polymer (polypyridine (Ppy), polymerization degree= 2,000) mixed in a solid content ratio of 25:75 by weight by spin coating at 2000 rpm for 20 sec., followed by predrying at 80° C. for 5 minutes and hot-baking at 180° C. for 1 hour in an oven to form a ca. 100 Å-thick alignment control film.

The alignment control film comprising nylon 66 and Ppy provided a volume resistivity of $9 \times 10^7$ ohm.cm as measured according to the above-described method.

Each of the alignment control films was subjected to rubbing (as a uniaxial aligning treatment) under the following conditions.

Rubber roller: 8 cm-dia. roller about which a nylon cloth was wound.

Rotation speed: 1000 rpm.

Pressing depth: 0.4 mm.

Substrate moving speed: 5 mm/sec.

Rubbing: 3 times (strokes) in one direction.

At this time, rubbing directions with respect to the first and second substrates and anti-parallel (parallel but oppositely directed) to each other.

Then, onto one of the above substrate, a 0.01 wt. %-solution in isopropyl alcohol (IPA) of silica beads of 2.0 μm in average diameter was applied at a dispersion density of ca. 300 particles/mm² by spin coating at 1500 rpm for 10 sec.

These two substrates were applied to each other, followed by hot curing at 150° C. for 90 min. in an oven to form a blank cell.

Into the blank cell, a liquid crystal composition identical to that used in Example 1 was injected at an isotropic phase temperature (100° C.) under reduced pressure (10 Pa). Thereafter, one of the substrates was cooled quickly by contact of it with a metal plate and then the entire cell was gradually cooled to a room temperature (chiral smectic C phase) to prepare a liquid crystal device.

The liquid crystal device thus prepared was evaluated in the same manner as in Example 1.

The liquid crystal device provided a Td of 0.50% and a $V_H$ (difference in inversion threshold voltage) of 0.5 V.

COMPARATIVE EXAMPLE 4

A liquid crystal device was prepared and evaluated in the same manner as in Example 3 except that a 1.0 wt. %-solution in formic acid of nylon 6 (polymerization degree=5000) was used instead of the 0.5 wt. %-solution in formic acid of nylon 66 and Ppy (used in Example 3) to form a ca. 100 Å-thick alignment control film.

The nylon 6 alignment control film provided a volume resistivity of $1.5 \times 10^{10}$ ohm.cm and the liquid crystal device provided a Td of 1.5% and a $V_H$ of 2.8 V.

The evaluation results in Example 3 and Comparative Example 4 are summarized in Table 2.

TABLE 2

| Example No. | Resistivity (ohm.cm) | $V_H$ at 10° C. (V) |
| --- | --- | --- |
| Ex. 3 | $9 \times 10^7$ | 0.5 |
| Comp. Ex. 4 | $1.5 \times 10^{10}$ | 2.8 |

As described hereinabove, according to the present invention, it is possible to provide a liquid crystal device including an alignment control film having a good conductive performance without incorporating conductive fine particles, a charge transfer complex and a dopant in the alignment control film. Particularly, a high-speed switching which has not been attained by conventional liquid crystal devices can be realized in a chiral smectic liquid crystal device of a high contrast and a high brightness using a chiral smectic liquid crystal composition providing a bookshelf structure or a structure close thereto having a small layer inclination angle. Further, a depolarization (reverse electric) field as a conventional difficulty adversely affecting a switching characteristic of a liquid crystal device using a liquid crystal composition comprising a fluorine-containing mesomorphic compound having a fluorocarbon terminal portion can be minimized by appropriately controlling a composition (combination of component materials) of an alignment control layer used in the device.

The invention may be embodied in other specific forms without departing from the spirit or essential characteristics thereof. The present embodiments and examples are therefore to be considered in all respects as illustrative and not restrictive, the scope of the invention being indicated by the appended claims rather than by foregoing description and all changes which come within the meaning and range of equivalency of the claims are therefore indicated to be embraced therein.

What is claimed is:

1. A liquid crystal device, comprising: a pair of substrates at least one of which is provided with an alignment control film, and a liquid crystal composition disposed between the substrates and contacting said alignment control film, wherein said alignment control film comprises an amide polymer and a pyridine-based polymer.

2. A device according to claim 1, wherein said amide polymer comprises a polyamide having a recurring unit represented by a formula P-1 shown below and said pyridine-based polymer comprises a polymer having a recurring unit represented by a formula P-2 shown below, respectively:

Formula P-1

—CONH—(CH$_2$)$_n$—NHCO—(CH$_2$)$_m$—, wherein n and m are independently an integer of 1–12.

Formula P-2

—A—B—, wherein —A— denotes pyridine-2,5-diyl connected with —B— at 2 or 5 position; and —B— denotes pyridine ring, thiophene ring, pyrrole ring, fluorenone ring, isothianaphthenepyridine ring, furan ring or thiophenepyridine ring, in which thiophene ring and pyrrole ring are independently optionally substituted at either one or both of 3 and 4 positions with alkyl group, alkoxy group, carboxylic ester group, benzene ring, naphthalene ring or anthracene ring to optionally form a fused ring.

3. A device according to claim 2, wherein said amide polymer has a polymerization degree of 1,000–100,000.

4. A device according to claim 2, wherein said pyridine-based polymer has a polymerization degree of 1,000–50,000.

5. A device according to claim 2, wherein said alignment control film comprises an amide polymer and a pyridine-based polymer in a weight ratio of 5:95 to 50:50.

6. A device according to claim 2, wherein said alignment control film comprises an amide polymer and a pyridine-based polymer in a weight ratio of 10:90 to 40:60.

7. A device according to claim 1, wherein said alignment control film has been subjected to a uniaxial aligning treatment.

8. A device according to claim 1, wherein said liquid crystal composition assumes chiral smectic C phase.

9. A device according to claim 1, wherein said liquid crystal composition provides a bookshelf structure or a structure close to the bookshelf structure and having a small layer inclination angle.

10. A device according to claim 1, wherein said liquid crystal composition has a ferroelectricity.

11. A device according to claim 1, wherein said alignment control film is provided to both of the substrates.

12. A device according to claim 1, wherein said alignment control film is provided to one of the substrate.

13. A device according to claim 1, wherein said liquid crystal composition comprises a fluorine-containing mesomorphic compound comprising a fluorocarbon terminal portion and a hydrocarbon terminal portion, the terminal portions being connected with a central core, and having smectic mesophase or latent smectic mesophase.

14. A device according to claim 13, wherein said fluorocarbon terminal portion in the fluorine-containing mesomorphic compound is represented by the formula —D$^1$—C$_{xa}$F$_{2xa}$—X, where xa is 1–20; X is —H or —F; —D$^1$— is —CO—O—(CH$_2$)$_{ra}$—, —O(CH$_2$)$_{ra}$—, —(CH$_2$)$_{ra}$—, —O—SO$_2$—, —SO$_2$—, —SO$_2$—(CH$_2$)$_{ra}$—, —O—(CH$_2$)$_{ra}$—O—(CH$_2$)$_{rb}$—, —(CH$_2$)$_{ra}$—N(C$_{pa}$H$_{2pa+1}$)—SO$_2$— or —(CH$_2$)$_{ra}$—N(C$_{pa}$H$_{2pa+1}$)—CO— where ra and rb are independently 1–20; and pa is 0–4.

15. A device according to claim 13, wherein said fluorocarbon terminal portion containing at least one catenary ether oxygen atom is represented by the formula —D$^2$—(C$_{xb}$F$_{2xb}$—O)$_{za}$—C$_{ya}$F$_{2ya+1}$, where xb is independently 1–10 for each (C$_{xb}$F$_{2xb}$—O); ya is 1–10; za is 1–10; —D$^2$— is —CO—O—C$_{rc}$H$_{2rc}$, —O—C$_{rc}$H$_{2rc}$—, —C$_{rc}$H$_{2rc}$—, —O—(C$_{sa}$H$_{2sa}$—O)$_{ta}$—C$_{rd}$H$_{2rd}$—, —O—SO$_2$—, —SO$_2$—, —SO$_2$—C$_{rc}$H$_{2rc}$—, —C$_{rc}$H$_{2rc}$—N(C$_{pb}$H$_{2pb+1}$)—SO$_2$13 , —C$_{rc}$H$_{2rc}$—N(C$_{pb}$H$_{2pb+1}$)—CO—, or a covalent bond where rc and rd are independently 1–20; sa is independently 1–10 for each (C$_{sa}$H$_{2sa}$—O); ta is 1–6; and pb is 0–4.

16. A device according to claim 13, wherein said fluorine-containing mesomorphic compound is represented by the following general formula (I):

Formula (I):

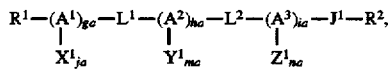

wherein A$^1$, A$^2$ and A$^3$ are each independently

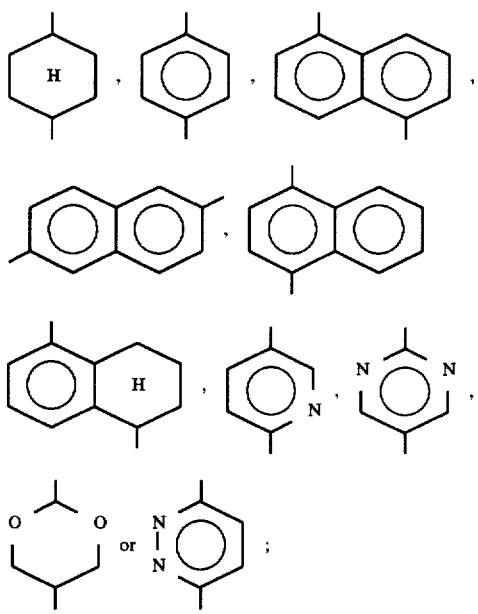

ga, ha and ia are independently an integer of 0–3 with the proviso that the sum of ga+ha+ia be at least 2;

L$^1$ and L$^2$ are independently a covalent bond, —CO—O—, —O—CO—, —COS—, —S—CO—, —CO—Se—, —Se—CO—, —CO—Te—, —Te—CO—, —CH$_2$CH$_2$—, —CH=CH—, —C≡—C—, —CH=N—, —N=CH—, —CH$_2$—O—, —O—CH$_2$—, —CO— or —O—;

X$^1$, Y$^1$ and Z$^1$ are each a substituent of A$^1$, A$^2$ and A$^3$, respectively, and each X$^1$, Y$^1$ and Z$^1$ are independently —H, —Cl, —F, —Br, —I, —OH, —OCH$_3$, —CH$_3$, —CN or —NO$_2$;

each ja, ma and na are independently an integer of 0–4;

J$^1$ is —CO—O—(CH$_2$)$_{ra}$—, —O—(CH$_2$)$_{ra}$—, —(CH$_2$)$_{ra}$—, —O—SO$_2$—, —SO$_2$—, —SO$_2$—(CH$_2$)$_{ra}$—, —O—(CH$_2$)$_{ra}$—O—(CH$_2$)$_{rb}$—, —(CH$_2$)$_{ra}$—N(C$_{pa}$H$_{2pa+1}$)—SO$_2$— or —(CH$_2$)$_{ra}$—N(C$_{pa}$H$_{2pa+1}$)—CO— where ra and rb are independently 1–20, and pa is 0–4;

R$^1$ is —O—C$_{qa}$H$_{2qa}$—O—C$_{qb}$H$_{2qb+1}$, —C$_{qa}$H$_{2qa}$—O—C$_{qb}$H$_{2qb+1}$, —C$_{qa}$H$_{2qa}$—R$^3$, —O—C$_{qa}$H$_{2qa}$—R$^3$, —CO—O—C$_{qa}$H$_{2qa}$—R$^3$, or —O—CO—C$_{qa}$H$_{2qa}$—R$^3$ which may be either straight chain or branched where R$^3$ is —O—CO—C$_{qb}$H$_{2qb+1}$, —CO—O—C$_{qb}$H$_{2qb+1}$, —H, —Cl, —F, —CF$_3$, —NO$_2$ or —CN; and qa and qb are independently 1–20; and R$^2$ is C$_{xa}$F$_{2xa}$—X, wherein X is —H or —F, xa is an integer of 1–20.

17. A device according to claim 13, wherein said fluorine-containing mesomorphic compound is represented by the general formula (II):

Formula (II):

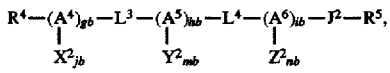

where $A^4$, $A^5$ and $A^6$ are each independently denote

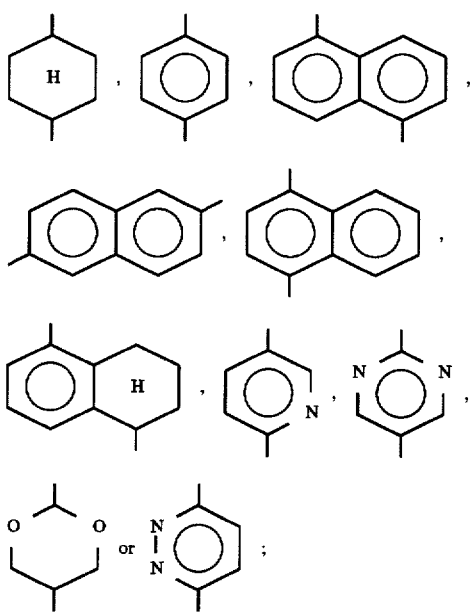

gb, hb and ib are each independently an integer of 0–3 with the proviso that the sum of gb+hb+ib be at least 2; each $L^3$ and $L^4$ are independently a single bond, —CO—O—, —O—CO—, —CO—S—, —S—CO—, —CO—Se—, —Se—CO—, —CO—Te—, —Te—CO—, —$(CH_2CH_2)_{ka}$— (ka is 1–4), —CH=CH—, —C≡C—, —CH=N—, —N=CH—, —$CH_2$—O—, —O—$CH_2$—, —CO— or —O—;

$X^2$, $Y^2$ and $Z^2$ are each a substituent of $A^4$, $A^5$ and $A^6$, respectively, and each $X_2$, $Y_2$ and $Z_2$ are independently —H, —Cl, —F, —Br, —I, —OH, —$OCH_3$, —$CH_3$, —$CF_3$, —O—$CF_3$, —CN or —$NO_2$; each jb, mb and nb are independently an integer of 0–4;

$J^2$ is —CO—O—$C_{rc}H_{2rc}$—, —)—$C_{rc}H_{2rc}$—, —$C_{rc}H_{2rc}$—, —O—$(C_{sa}H_{2sa}$—O$)_{ta}$—$C_{rd}H_{2rd}$—, —O—$SO_2$—, —$SO_2$—, —$SO_2$—$C_{rc}H_{2rc}$—, —$C_{rc}H_{2rc}$—N($C_{pb}H_{2pb+1}$)—$SO_2$— or —$C_{rc}H_{2rc}$—N($C_{pb}H_{2pb+1}$)—CO— where rc and rd are independently 1–20; sa is independently 1–10 for each ($C_{sa}H_{2sa}$—O), ta is 1–6; pb is 0–4;

$R^4$ is —O—$(C_{qc}H_{2qc}$—O$)_{wa}$—$C_{qd}H_{2qd+1}$, —$(C_{qc}H_{2qc}$—O$)_{wa}$—$C_{qd}H_{2qd+1}$, —$C_{qc}H_{2qc}$—$R^6$, —O—$C_{qc}H_{2qc}$—$R^6$, —CO—O—$C_{qc}H_{2qc}$—$R^6$, or O—CO—$C_{qc}H_{2qc}$—$R^6$ which may be either straight chain or branched where $R^6$ is —O—CO—$C_{qd}H_{2qd+1}$; —CO—O—$C_{qd}H_{2qd+1}$, —Cl, —F, —$CF_3$, —$NO_2$, —CN or —H; qc and qd are independently 1–20; wa is 1–10; and $R^5$ is $(C_{xb}F_{2xb}$—O$)_{za}$—$C_{ya}F_{2ya+1}$, where xb is independently 1–10 for each ($C_{xb}F_{2xb}$—O); ya is 1–10; and za is 1—10.

* * * * *

UNITED STATES PATENT AND TRADEMARK OFFICE
CERTIFICATE OF CORRECTION

PATENT NO. : 5,750,214

DATED : May 12, 1998

INVENTOR(S): NOBUHIRO ITO, ET AL.

It is certified that error appears in the above-identified patent and that said Letters Patent is hereby corrected as shown below:

COLUMN 1
Line 14, "outputs" should read --it outputs--;
Line 21, "human" should read --the human--;
Line 21, "health" should read --the health--;
Line 32, "use" should be deleted.

COLUMN 2
Line 13, "In case" should read --In the case--;
Line 56, "methods" should read --the methods--.

COLUMN 3
Line 28, "in case" should read --in a case--;
Line 44, "viscosity," should read --viscosity),--;
Line 47, "in case" should read --in a case--.

COLUMN 4
Line 1, "at an" should read --at a--;
Line 9, "$\tau$ denotes" should read --t denotes--;
Line 28, "provided" should read --is provided--;
Line 32, "direction These" should read --direction. These--;
Line 39, "thus" should read --this--;
Line 65, "with" should read --by--.

UNITED STATES PATENT AND TRADEMARK OFFICE
CERTIFICATE OF CORRECTION

PATENT NO. : 5,750,214

DATED : May 12, 1998

INVENTOR(S): NOBUHIRO ITO, ET AL.

It is certified that error appears in the above-identified patent and that said Letters Patent is hereby corrected as shown below:

COLUMN 5
  Line 5, "treatment" should read --treatments--;
  Line 29, "A still" should read --Still--.

COLUMN 6
  Line 26, "yet, it" should read --yet.  It--;
  Line 38, "of lone" should read --of the lone--;
  Line 38, "nitrogen" should read --the nitrogen--;
  Line 43, "electron" should read --electrons--;
  Line 44, "from" should read --from the--;
  Line 46, "proton." should read --protons.--.

COLUMN 7
  Line 2, "66 is" should read --66, is--;
  Line 11, "each" should read --to each--;
  Line 14, "an" should read --of an--;
  Line 14, "such that" should be deleted.

COLUMN 8
  Line 59, "mesophase" should read --(meso)phase--.

COLUMN 10
  Line 20, "$H_{2q+1}$," should read --$H_{2qb+1}$,--.

COLUMN 12
  Line 9, "descried" should read --described--.

UNITED STATES PATENT AND TRADEMARK OFFICE
CERTIFICATE OF CORRECTION

PATENT NO. : 5,750,214

DATED : May 12, 1998

INVENTOR(S): NOBUHIRO ITO, ET AL.                                          Page 3 of 5

It is certified that error appears in the above-identified patent and that said Letters Patent is hereby corrected as shown below:

COLUMN 27
 "descried" should read --described--.

COLUMN 27-28
 Figure II-4, "$OCF_2$ should be deleted;
 Figure II-7, "$C_{10}H_{21}$" should read --$C_{10}H_{21}O$--;
 Figure II-8, "$C_8H_{17}$" should read --$C_8H_{17}O$--;
 Figure II-9, "$C_8H_{17}$" should read --$C_8H_{17}O$--, and "$OC_4F_9$" should read --$OC_4F_9$--.

COLUMN 29-30
 Figure II-17, "$OCF_2$" (first occurrence) should read --$OCH_2$--.

COLUMN 33-34
 Figure II-42, "$CF_4$" should read --$CF_2$--.

COLUMN 35-36
 Figure (1), "$C_6$" should read --$C_5$--;
 Figure (2), "$C_8$" should read --$C_3$--.

COLUMN 37-38
 Figure (26), "—O—" (first occurrence) should be deleted, and
"" should read ----.

UNITED STATES PATENT AND TRADEMARK OFFICE
CERTIFICATE OF CORRECTION

PATENT NO. : 5,750,214

DATED : May 12, 1998

INVENTOR(S): NOBUHIRO ITO, ET AL.

It is certified that error appears in the above-identified patent and that said Letters Patent is hereby corrected as shown below:

COLUMN 39-40

Figure (29), "$\underset{C-O}{\overset{O}{\|}}$" should read -- $\underset{O-C}{\overset{O--}{\|}}$ ;

Figure (36), "$\overset{|}{C}h_3$" should read -- $\overset{|}{C}H_3$ -- .

COLUMN 41-42

Figure (47), "$\overset{|}{C}h_3$" should read -- $\overset{|}{C}H_3$ -- ;

COLUMN 45, line 65

Figure (45), "(mutually" should read --(mutual-- .

COLUMN 48

Figure 2-9,  should read -- 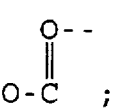 -- ;

Line 44, "paranicol" should read --para-nicol--;
Line 58, "preferable" should read --preferably-- .

COLUMN 49

Line 15, "ia" should read --a--;
Line 40, "voltages," should read --voltage,-- .

UNITED STATES PATENT AND TRADEMARK OFFICE
CERTIFICATE OF CORRECTION

PATENT NO. : 5,750,214

DATED : May 12, 1998

INVENTOR(S): NOBUHIRO ITO, ET AL.

It is certified that error appears in the above-identified patent and that said Letters Patent is hereby corrected as shown below:

<u>COLUMN 50</u>
Line 15, "2," should be deleted;
Line 16, "000)" should read --2,000)--.

<u>COLUMN 55</u>
Line 54, "SO$_2$13," should read --SO$_2$,--.

<u>COLUMN 56</u>
Line 33, "—C≡—C—," should read -- —C≡C— --.

<u>COLUMN 57</u>
Line 1, "are" should be deleted.

<u>COLUMN 58</u>
Line 10, "—)—C$_{rc}$H$_{2rc}$—," should read -- —O—C$_{rc}$H$_{2rc}$—, --.

Signed and Sealed this

Twenty-first Day of September, 1999

Attest:

Q. TODD DICKINSON

*Attesting Officer*   *Acting Commissioner of Patents and Trademarks*

UNITED STATES PATENT AND TRADEMARK OFFICE
CERTIFICATE OF CORRECTION

PATENT NO. : 5,750,214
DATED : May 12, 1998
INVENTOR(S) : NOBUHIRO ITO, ET AL.

It is certified that error appears in the above-indentified patent and that said Letters Patent is hereby corrected as shown below:

<u>ON THE TITLE PAGE</u> ITEM: [30]
```
 insert: --Foreign Application Priority Data
    Dec. 13, 1995     [JP]      Japan . . . . . 7-346310--.
```

Signed and Sealed this

Twenty-sixth Day of October, 1999

Attest:

Q. TODD DICKINSON

*Attesting Officer*  *Acting Commissioner of Patents and Trademarks*